US006178488B1

(12) United States Patent
Manning

(10) Patent No.: US 6,178,488 B1
(45) Date of Patent: Jan. 23, 2001

(54) METHOD AND APPARATUS FOR PROCESSING PIPELINED MEMORY COMMANDS

(75) Inventor: Troy A. Manning, Meridian, ID (US)

(73) Assignee: Micron Technology, Inc., Boise, ID (US)

(*) Notice: Under 35 U.S.C. 154(b), the term of this patent shall be extended for 0 days.

(21) Appl. No.: 09/141,838

(22) Filed: Aug. 27, 1998

(51) Int. Cl.$^7$ .................................................... G06F 12/18
(52) U.S. Cl. ............................... 711/169; 710/36; 710/37; 710/38
(58) Field of Search ................................. 710/38, 37, 36; 711/169

(56) References Cited

U.S. PATENT DOCUMENTS

| 4,312,068 | 1/1982 | Goss et al. ............................... 371/37 |
| 4,695,952 | 9/1987 | Howland ............................... 364/200 |

(List continued on next page.)

FOREIGN PATENT DOCUMENTS

| 0 468 480 A2 | 5/1992 | (EP) . |
| 0 486 480 A2 | 5/1992 | (EP) ............................... B01D/21/26 |
| 0 605 887 A2 | 7/1994 | (EP) ............................... G11C/7/00 |
| 2 128 383 | 4/1984 | (GB) ............................... G11C/5/00 |
| 59-116829 | 7/1984 | (JP) ............................... G06F/1/04 |
| 09161475 | 6/1997 | (JP) . |
| WO 96/24935 | 8/1996 | (WO) ............................... G11C/16/06 |

OTHER PUBLICATIONS

Gillingham, P., "SLDRAM Architectural and Functional Overview," SLDRAM Consortium, Aug. 29, 1997, pp. 1–14.

Descriptive literature entitled, "400MHz SLDRAM, 4M ×16 SLDRAM Pipelined, Eight Bank, 2.5 V Operation," SLDRAM Consortium Advance Sheet, published throughout the United States, pp. 1–22.

*Primary Examiner*—John W. Cabeca
*Assistant Examiner*—Christian P. Chace
(74) *Attorney, Agent, or Firm*—Dorsey & Whitney LLP

(57) ABSTRACT

A method and apparatus for processing pipelined command packets in a packefized memory device. The command packets are initially stored in one of several command units, and the commands are subsequently coupled to a common command processor for execution. The command units each include a latch for storing a command packet, a counter, and a start command generator. The counter is preloaded with a count corresponding to the timing that the command is received at a location within the memory device. The counter begins counting responsive to a flag bit received with the command packet. The start command generator receives the count of the counter, and decodes different counts depending on the type of command (e.g., a "read" or a "write") and the speed of a clock signal that is used to control the operation of the memory device. When the start command generator decodes a count, it latches command bits of the applied command packet and generates a start command signal. Thus, the start command signal is generated after the flag signal by a delay that corresponds to the type of memory command and the clock speed. The latched command bits and the start command signal are applied to a command processor that executes the commands in a pipeline using a sequencer to generate a sequence of timing signals, and generates command signals from the latched command bits. The specific timing signal used is a function of the type of memory operation corresponding to the command bits and the clock speed. The command processor generates and applies an acknowledgment signal to the command unit upon receipt of the start command signal. The command unit is available to receive a new command upon receipt of the acknowledgment signal.

37 Claims, 12 Drawing Sheets

U.S. PATENT DOCUMENTS

| | | | |
|---|---|---|---|
| 4,768,190 | 8/1988 | Giancarlo | 370/86 |
| 4,845,664 | 7/1989 | Aichelmann, Jr. et al. | 364/900 |
| 4,849,702 | 7/1989 | West et al. | 328/63 |
| 4,943,946 | 7/1990 | Brent | 365/189.12 |
| 5,099,481 | 3/1992 | Miller | 371/22.1 |
| 5,175,732 | 12/1992 | Hendel et al. | 370/94.1 |
| 5,235,595 | 8/1993 | O'Dowd | 370/94.1 |
| 5,297,029 | 3/1994 | Nakai et al. | 365/238.5 |
| 5,321,700 | 6/1994 | Brown et al. | 371/27 |
| 5,325,493 | 6/1994 | Herrell et al. | 395/375 |
| 5,337,410 | 8/1994 | Appel | 395/162 |
| 5,355,345 | 10/1994 | Dickinson et al. | 365/230.01 |
| 5,367,643 | 11/1994 | Chang et al. | 395/325 |
| 5,390,224 | 2/1995 | Komatsuda | 377/56 |
| 5,402,390 | 3/1995 | Ho et al. | 365/225.7 |
| 5,454,093 | 9/1995 | Abdulhafiz et al. | 395/460 |
| 5,471,430 | 11/1995 | Sawada et al. | 365/222 |
| 5,553,010 | 9/1996 | Tanihira et al. | 364/715.08 |
| 5,566,325 | 10/1996 | Bruce, II et al. | 395/494 |
| 5,581,512 | 12/1996 | Kitamura | 365/233 |
| 5,600,605 | 2/1997 | Schaefer | 365/233 |
| 5,615,355 | 3/1997 | Wagner | 395/494 |
| 5,636,174 | 6/1997 | Rao | 365/230.03 |
| 5,640,354 | 6/1997 | Jang et al. | 365/201 |
| 5,652,733 | 7/1997 | Chen et al. | 365/233 |
| 5,701,434 | 12/1997 | Nakagawa | 395/484 |
| 5,713,005 | 1/1998 | Proebsting | 395/496 |
| 5,732,041 | 3/1998 | Joffe | 365/230.05 |
| 5,737,563 | 4/1998 | Shigeeda | 395/405 |
| 5,764,584 | 6/1998 | Fukiage et al. | 365/230.03 |
| 5,778,419 | 7/1998 | Hansen et al. | 711/112 |
| 5,793,688 | 8/1998 | McLaury | 365/203 |
| 5,812,074 | 9/1998 | Chung | 341/67 |
| 5,825,711 | 10/1998 | Manning | 365/230.03 |
| 5,831,929 | 11/1998 | Manning | 365/233 |
| 5,835,925 | 11/1998 | Kessler et al. | 711/2 |
| 5,848,431 | 12/1998 | Pawlowski | 711/5 |
| 5,860,080 | 1/1999 | James et al. | 711/4 |
| 5,887,146 | 3/1999 | Baxter et al. | 395/284 |
| 5,907,860 | 5/1999 | Garibay, Jr. et al. | 711/117 |
| 5,920,510 | 7/1999 | Yukutake et al. | 365/189.05 |
| 5,920,710 | 7/1999 | Tan et al. | 395/392 |
| 5,946,260 | 8/1999 | Manning | 365/230.03 |
| 5,996,043 | 11/1999 | Manning | 711/105 |
| 6,032,220 | 2/2000 | Martin et al. | 711/5 |
| 6,055,615 | 4/2000 | Okajima | 711/169 |

OTHER PUBLICATIONS

"Draft Standard for a High–Speed Memory Interface (SyncLink)," Microprocessor and Microcomputer Standards Subcommittee of the IEEE Computer Society, Copyright 1996 by the Institute of Electrical and Electronics Engineers, Inc., New York, NY, pp. 1–56.

"Increasing Data Read Rate From Memories," IBM Technical Disclosure Bulletin, vol. 30, No. 12, May 1988, pp. 339–341.

| CA9 | CA8 | CA7 | CA6 | CA5 | CA4 | CA3 | CA2 | CA1 | CA0 |
|-----|-----|-----|-----|-----|-----|-----|-----|-----|-----|
| ID6 | ID5 | ID4 | ID3 | ID2 | ID1 | ID0 | CMD5 | CMD4 | CMD3 |
| CMD2 | CMD1 | CMD0 | BNK2 | BNK1 | BNK0 | ROW9 | ROW8 | ROW7 | ROW6 |
| ROW5 | ROW4 | ROW3 | ROW2 | ROW1 | ROW0 | ∅ | ∅ | ∅ | ∅ |
| ∅ | ∅ | ∅ | COL6 | COL5 | COL4 | COL3 | COL2 | COL1 | COL0 |

ID6–ID0 = DEVICE ID VALUE
CMD5–CMD0 = COMMAND CODE
BNK2–BNK0 = BANK ADDRESS

ROW9–ROW0 = ROW ADDRESS
COL6–COL0 = COLUMN ADDRESS
∅ = UNUSED

*Fig. 2*

METHOD AND APPARATUS FOR PROCESSING PIPELINED MEMORY COMMANDS

TECHNICAL FIELD

This invention relates generally to memory devices used in computer systems and, more particularly, to a method and apparatus for the pipelined processing of memory commands.

BACKGROUND OF THE INVENTION

Conventional computer systems include a processor (not shown) coupled to a variety of memory devices, including read-only memories ("ROMs") which traditionally store instructions for the processor, and a system memory to which the processor may write data and from which the processor may read data. The processor may also communicate with an external cache memory, which is generally a static random access memory ("SRAM"). The processor also communicates with input devices, output devices, and data storage devices.

Processors generally operate at a relatively high speed. Processors such as the Pentium® and Pentium II® microprocessors are currently available that operate at clock speeds of at least 400 MHz. However, the remaining components of existing computer systems, with the exception of SRAM cache, are not capable of operating at the speed of the processor. For this reason, the system memory devices, as well as the input devices, output devices, and data storage devices, are not coupled directly to the processor bus. Instead, the system memory devices are generally coupled to the processor bus through a memory controller, bus bridge or similar device, and the input devices, output devices, and data storage devices are coupled to the processor bus through a bus bridge. The memory controller allows the system memory devices to operate at a clock frequency that is substantially lower than the clock frequency of the processor. Similarly, the bus bridge allows the input devices, output devices, and data storage devices to operate at a substantially lower frequency. Currently, for example, a processor having a 400 MHz clock frequency may be mounted on a mother board having a 66 MHz clock frequency for controlling the system memory devices and other components.

Access to system memory is a frequent operation for the processor. The time required for the processor, operating, for example, at 400 MHz, to read data from or write data to a system memory device operating at, for example, 66 MHz, greatly slows the rate at which the processor is able to accomplish its operations. Thus, much effort has been devoted to increasing the operating speed of system memory devices.

System memory devices are generally dynamic random access memories ("DRAMs"). Initially, DRAMs were asynchronous and thus did not operate at even the clock speed of the motherboard. In fact, access to asynchronous DRAMs often required that wait states be generated to halt the processor until the DRAM had completed a memory transfer. However, the operating speed of asynchronous DRAMs was successfully increased through such innovations as burst and page mode DRAMs, which did not require that an address be provided to the DRAM for each memory access. More recently, synchronous dynamic random access memories ("SDRAMs") have been developed to allow the pipelined transfer of data at the clock speed of the motherboard. However, even SDRAMs are incapable of operating at the clock speed of currently available processors. Thus, SDRAMs cannot be connected directly to the processor bus, but instead must interface with the processor bus through a memory controller, bus bridge, or similar device. The disparity between the operating speed of the processor and the operating speed of SDRAMs continues to limit the speed at which processors may complete operations requiring access to system memory.

A solution to this operating speed disparity has been proposed in the form of a computer architecture known as "SLDRAM." In the SLDRAM architecture, the system memory may be coupled to the processor either directly through the processor bus or through a memory controller. Rather than requiring that separate address and control signals be provided to the system memory, SLDRAM memory devices receive command packets that include both control and address information. The SLDRAM memory device then outputs or receives data on a data bus that may be coupled directly to the data bus portion of the processor bus.

An example of a computer system 10 using the SLDRAM architecture is shown in FIG. 1. The computer system 10 includes a processor 12 having a processor bus 14 coupled to three packetized dynamic random access memory or SLDRAM devices 16a–c. The computer system 10 also includes one or more input devices 20, such as a keypad or a mouse, coupled to the processor 12 through a bus bridge 22 and an expansion bus 24, such as an industry standard architecture ("ISA") bus or a Peripheral component interconnect ("PCI") bus. The input devices 20 allow an operator or an electronic device to input data to the computer system 10. One or more output devices 30 are coupled to the processor 12 to display or otherwise output data generated by the processor 12. The output devices 30 are coupled to the processor 12 through the expansion bus 24, bus bridge 22 and processor bus 14. Examples of output devices 24 include printers and a video display units. One or more data storage devices 38 are coupled to the processor 12 through the processor bus 14, bus bridge 22, and expansion bus 24 to store data in or retrieve data from storage media (not shown). Examples of storage devices 38 and storage media include fixed disk drives floppy disk drives, tape cassettes and compact-disk read-only memory drives.

In operation, the processor 12 communicates with the memory devices 16a–c via the processor bus 14 by sending the memory devices 16a–c command packets that contain both control and address information. Data is coupled between the processor 12 and the memory devices 16a–c, through a data bus portion of the processor bus 14. Although all the memory devices 16a–c are coupled to the same conductors of the processor bus 14, only one memory device 16a–c at a time reads or writes data, thus avoiding bus contention on the processor bus 14. Bus contention is avoided by each of the memory devices 16a–c on the bus bridge 22 having a unique identifier, and the command packet contains an identifying code that selects only one of these components.

A typical command packet for a SLDRAM is shown in FIG. 2. The command packet is formed by 4 packet words each of which contains 10 bits of data. The first packet word $W_1$ contains 7 bits of data identifying the packetized DRAM 16a–c that is the intended recipient of the command packet. As explained below, each of the packetized DRAMs is provided with a unique ID code that is compared to the 7 ID bits in the first packet word $W_1$. Thus, although all of the packetized DRAMs 16a–c will receive the command packet, only the packetized DRAM 16a–c having an ID code that matches the 7 ID bits of the first packet word $W_1$ will respond to the command packet.

The remaining 3 bits of the first packet word $W_1$ as well as 3 bits of the second packet word $W_2$ comprise a 6 bit command. Typical commands are read and write in a variety of modes, such as accesses to pages or banks of memory cells. The remaining 7 bits of the second packet word $W_2$ and portions of the third and fourth packet words $W_3$ and $W_4$ comprise a 20 bit address specifying a bank, row and column address for a memory transfer or the start of a multiple bit memory transfer. In one embodiment, the 20-bit address is divided into 3 bits of bank address, 10 bits of row address, and 7 bits of column address.

Although the command packet shown in FIG. 2 is composed of 4 packet words each containing up to 10 bits, it will be understood that a command packet may contain a lesser or greater number of packet words, and each packet word may contain a lesser or greater number of bits.

The computer system 10 also includes a number of other components and signal lines that have been omitted from FIG. 1 in the interests of brevity. For example, as explained below, the memory devices 16a–c also receive a master clock signal to provide internal timing signals, a data clock signal clocking data into and out of the memory device 16, and a FLAG signal signifying the start of a command packet.

One of the memory devices 16a is shown in block diagram form in FIG. 3. The memory device 16a includes a clock divider and delay circuit 40 that receives a master clock signal 42 and generates a large number of other clock and timing signals to control the timing of various operations in the memory device 16. The memory device 16 also includes a command buffer 46 and an address capture circuit 48 which receive an internal clock CLK signal, a command packet CA0–CA9 on a command bus 50, and a FLAG signal on line 52. As explained above, the command packet contains control and address information for each memory transfer, and the FLAG signal identifies the start of a command packet. The command buffer 46 receives the command packet from the bus 50, and compares at least a portion of the command packet to identifying data from an ID register 56 to determine if the command packet is directed to the memory device 16a or some other memory device 16b, c. If the command buffer 46 determines that the command is directed to the memory device 16a, it then provides the command to a command decoder and sequencer 60. The command decoder and sequencer 60 generates a large number of internal control signals to control the operation of the memory device 16a during a memory transfer corresponding to the command.

The address capture circuit 48 also receives the command packet from the command bus 50 and outputs a 20-bit address corresponding to the address information in the command. The address is provided to an address sequencer 64 which generates a corresponding 3-bit bank address on bus 66, an 11-bit row address on bus 68, and a 6-bit column address on bus 70.

One of the problems of conventional DRAMs is their relatively low speed resulting from the time required to precharge and equilibrate circuitry in the DRAM array. The packetized DRAM 16a shown in FIG. 3 largely avoids this problem by using a plurality of memory banks 80, in this case eight memory banks 80a–h. After a read from one bank 80a, the bank 80a can be precharged while the remaining banks 80b–h are being accessed. Each of the memory banks 80a–h receives a row address from a respective row latch/decoder/driver 82a–h. All of the row latch/decoder/drivers 82a–h receive the same row address from a predecoder 84 which, in turn, receives a row address from either a row address register 86 or a refresh counter 88 as determined by a multiplexer 90. However, only one of the row latch/decoder/drivers 82a–h is active at any one time as determined by bank control logic 94 as a function of bank data from a bank address register 96.

The column address on bus 70 is applied to a column latch/decoder 100 which, in turn, supplies I/O gating signals to an I/O gating circuit 102. The I/O gating circuit 102 interfaces with columns of the memory banks 80a–h through sense amplifiers 104. Data is coupled to or from the memory banks 80a–h through the sense amps 104 and I/O gating circuit 102 to a data path subsystem 108 which includes a read data path 110 and a write data path 112. The read data path 110 includes a read latch 120 receiving and storing data from the I/O gating circuit 102. In the memory device 16a shown in FIG. 2, 64 bits of data are applied to and stored in the read latch 120. The read latch then provides four 16-bit data words to a multiplexer 122. The multiplexer 122 sequentially applies each of the 16-bit data words to a read FIFO buffer 124. Successive 16-bit data words are clocked through the FIFO buffer 124 by a clock signal generated from an internal clock by a programmable delay circuit 126. The FIFO buffer 124 sequentially applies the 16-bit words and two clock signals (a clock signal and a quadrature clock signal) to a driver circuit 128 which, in turn, applies the 16-bit data words to a data bus 130 forming part of the processor bus 14. The driver circuit 128 also applies the clock signals to a clock bus 132 so that a device such as the processor 12 reading the data on the data bus 130 can be synchronized with the data.

The write data path 112 includes a receiver buffer 140 coupled to the data bus 130. The receiver buffer 140 sequentially applies 16-bit words from the data bus 130 to four input registers 142, each of which is selectively enabled by a signal from a clock generator circuit 144. Thus, the input registers 142 sequentially store four 16-bit data words and combine them into one 64-bit data word applied to a write FIFO buffer 148. The write FIFO buffer 148 is clocked by a signal from the clock generator 144 and an internal write clock WCLK to sequentially apply 64-bit write data to a write latch and driver 150. The write latch and driver 150 applies the 64-bit write data to one of the memory banks 80a–h through the I/O gating circuit 102 and the sense amplifier 104.

As mentioned above, an important goal of the SLDRAM architecture is to allow data transfer between a processor and a memory device to occur at a significantly faster rate. However, the operating rate of a packetized DRAM, including the packetized DRAM shown in FIG. 3, is limited by the time required to receive and process command packets applied to the memory device 16a. More specifically, not only must the command packets be received and stored, but they must also be decoded and used to generate a wide variety of signals. However, in order for the memory device 16a to operate at a very high speed, the command packets must be applied to the memory device 16a at a correspondingly high speed. As the operating speed of the memory device 16a increases, the command packets are provided to the memory device 16a at a rate that can exceed the rate at which the command buffer 46 can process the command packets.

One solution that has been developed to increase the operating speed of the command buffer 46 is to use a queue and multiple command units, also known as a pipeline or pipelining. Pipelining is "[a] method of fetching and decoding instructions (preprocessing) in which, at any given time, several program instructions are in various stages of being fetched or decoded . . . " Computer Dictionary, Microsoft Press, copyright 1991. A command unit is a portion of the command buffer 46 that initially processes the command packets received from the microprocessor. Each of the command units retrieves a single command from a command packet, processes the command, and transmits the processed command to another portion of the command buffer 46 for further processing and execution. After the command unit processes a first command, another command unit processes a second command, etc. By using multiple command units, multiple commands can be processed simultaneously.

This method of operation allows the memory device 16 to continue to receive command packets even though the prior command packet has not yet been processed. In fact, the command packets can be received as long as the average rate at which the command packets are received is less than the average time to process the command packets and complete memory transfer operations. As a result, memory devices using the packetized command buffer 46, described above, are able to operate at a relatively high speed. A memory device 16 is described in greater detail in U.S. patent application Ser. No. 08/994,461, "Method and System For Processing Pipelined Memory Commands," herein incorporated by reference.

The command buffer 46 includes a column command unit 228, shown in FIG. 4, having a plurality of command units 500a–h, shown in FIG. 6. Each of the command units 500 stores a plurality of command bits of a command packet, and with the use of a counter 550, described below, subsequently outputs the stored command bits and a command start signal to a command processor 508. In response to receiving the command start signal, the command processor 508 processes the command bits to generate at least one command signal.

Each of the command units 500 uses the counter 550 and a start command generator 560, shown in FIG. 7, to generate the command start signal. The counter is loaded with an initial count corresponding to bits in the command packet. The counter 550 receives a timing signal and then counts from the initial count to a terminal count responsive to a clock signal. The start command generator 560 produces the command start signal at one of several of the counts that are each a function of the command indicated by the stored command bits, and/or the frequency of the clock signal. As mentioned above, in response to receiving the command start signal, the command processor 508, shown in FIG. 6, processes the command bits received from the command unit 500 to generate at least one command signal.

Once the counter reaches the terminal count the counter stops counting and generates a signal indicating that the command unit 500 is available to receive a new command from the next command packet in the queue/pipeline. Only after the counter 550 reaches the terminal count is the command unit 500 made available to receive the new command even though it had completed its task of generating the command start signal when the counter reached the appropriate count. Thus, during the period between the counter generating the command start signal and the counter reaching the terminal count it is needlessly idle since it has completed its function yet is unable to accept a new command packet. This wait state slows down the frequency at which the command unit 500 may receive and process the commands.

For example, the command start signal for a read command with a 400 MHz clock signal may be generated on on count 12. The counter may have been loaded with an initial count of 63. Thus, when the counter is activated, it begins counting down to the terminal count, typically zero, from 63. When the counter reaches count 12, the command start signal is generated, initiating the processing of the command bits by the command processor 508 to perform a memory transfer operation. However, the counter 550 continues to decrement until it reaches zero. The counter 550 then sends a signal to the start command generator 560 indicating that the command has been processed and transmitted to the command processor 508. Upon receiving the signal, the command unit 500 becomes available to receive a new command. The command unit 500 thus remains idle while the counter decrements from 11 to zero.

One solution to this problem might be to change the terminal count. Instead of the terminal count being zero, it could be 10, for example. However, as mentioned above, the count at which the command unit 500 generates the command start signal will vary with the nature of the command, e.g, read, write, initiate equilibration, and with the frequency of the clock signal. Thus the terminal count could only be changed to the lowest count used to generate the command start signal. For example, for some SLDRAMs this would be a count of 4 since a count of 5 generates a command start signal for a write operation at a clock frequency of 400 MHz. In contrast, the command unit 500 generates the start signal for a write operation at a clock frequency of 400 MHz at a count of 12. Thus, raising the terminal count to 4 would still result in a wait of 8 counts for a write operation at a clock frequency of 400 MHz.

Similarly, the terminal count for a DRAM may vary depending on the clock frequency of the memory device. For example, as seen above, the terminal count for a write operation using a clock frequency of 400 MHz could be a count of 4. The same DRAM using a clock frequency of 800 MHz may execute the write command on a count of 10, and thus could have a terminal count of 9. However, the DRAMs could not be used efficiently, if at all, with a different clock frequency.

SUMMARY OF THE INVENTION

The present invention provides a method and apparatus for processing memory commands applied to a memory device. A command unit is enabled to store a command packet upon receipt of an acknowledgment signal. When enabled, the command unit receives and processes the command packet and generates at least one command signal corresponding to the command packet. A command processor receives at least one of the command signals from the enabled command unit, and processes the command signal or signals to generate at least one control signal responsive thereto. The command processor generates the acknowledgment signal as soon as the control signal is generated, and transmits the acknowledgment signal to the command unit. The command unit can then receive the next command packet as soon as the control signal is generated.

BRIEF DESCRIPTION OF THE DRAWINGS

FIG. 2 is a diagram showing a typical command packet for a SLDRAM.

DETAILED DESCRIPTION OF THE INVENTION

Figure 1:
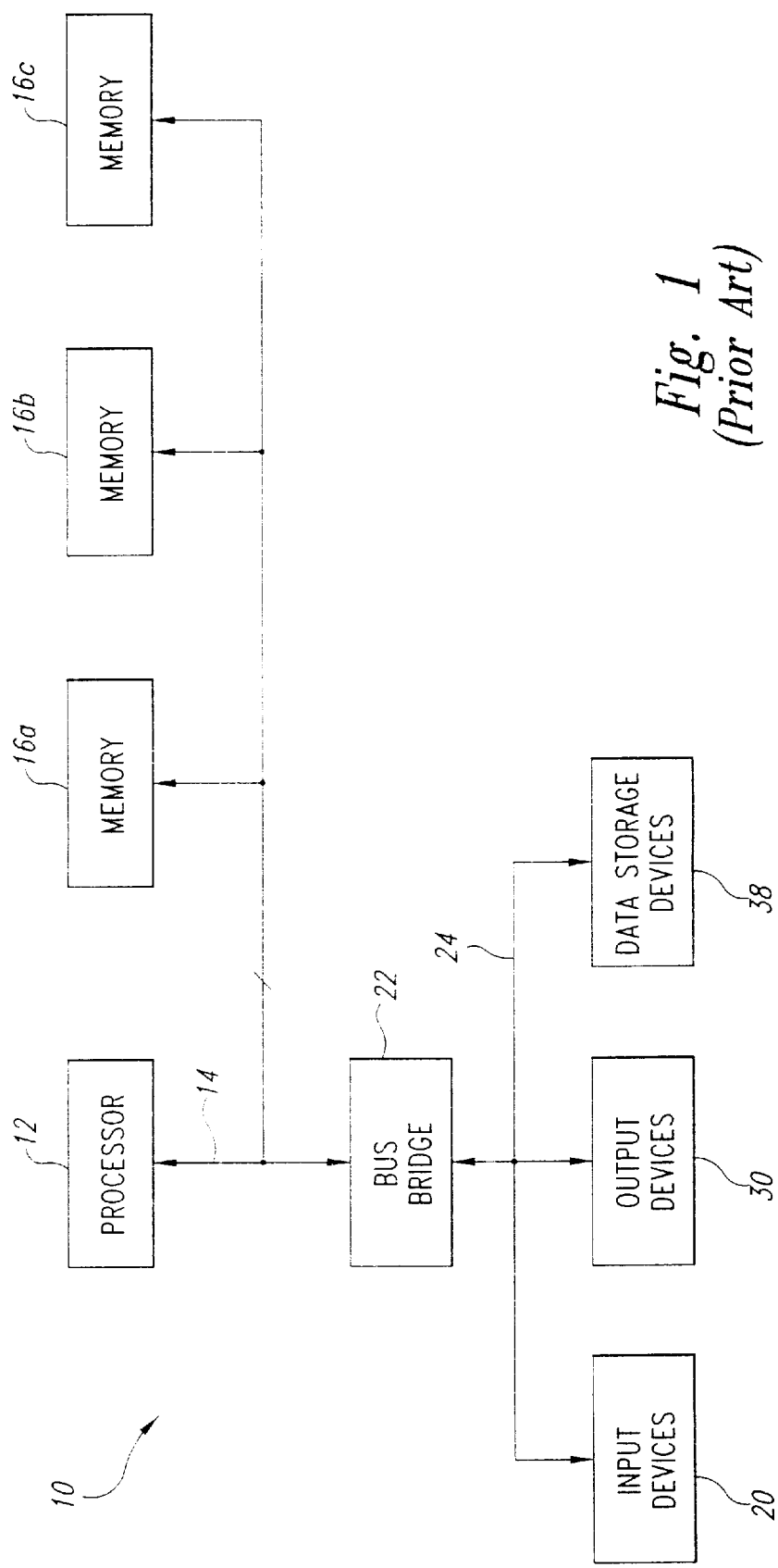
FIG. 1 is a block diagram of a computer system using SLDRAM architecture.
Figure 3:
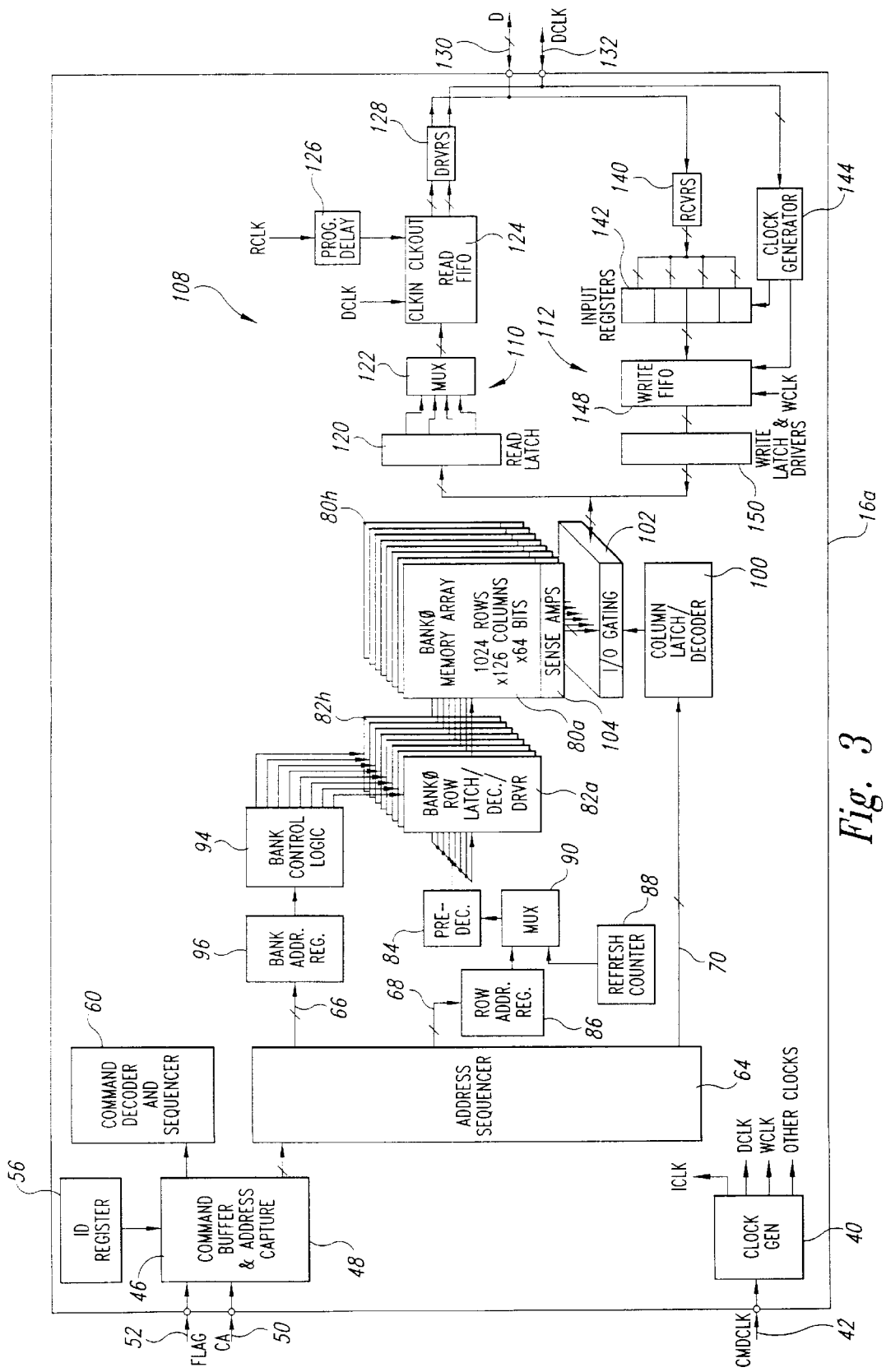
FIG. 3 is a block diagram of a packetized DRAM that may be used in the computer system of FIG. 1.
Figure 4:
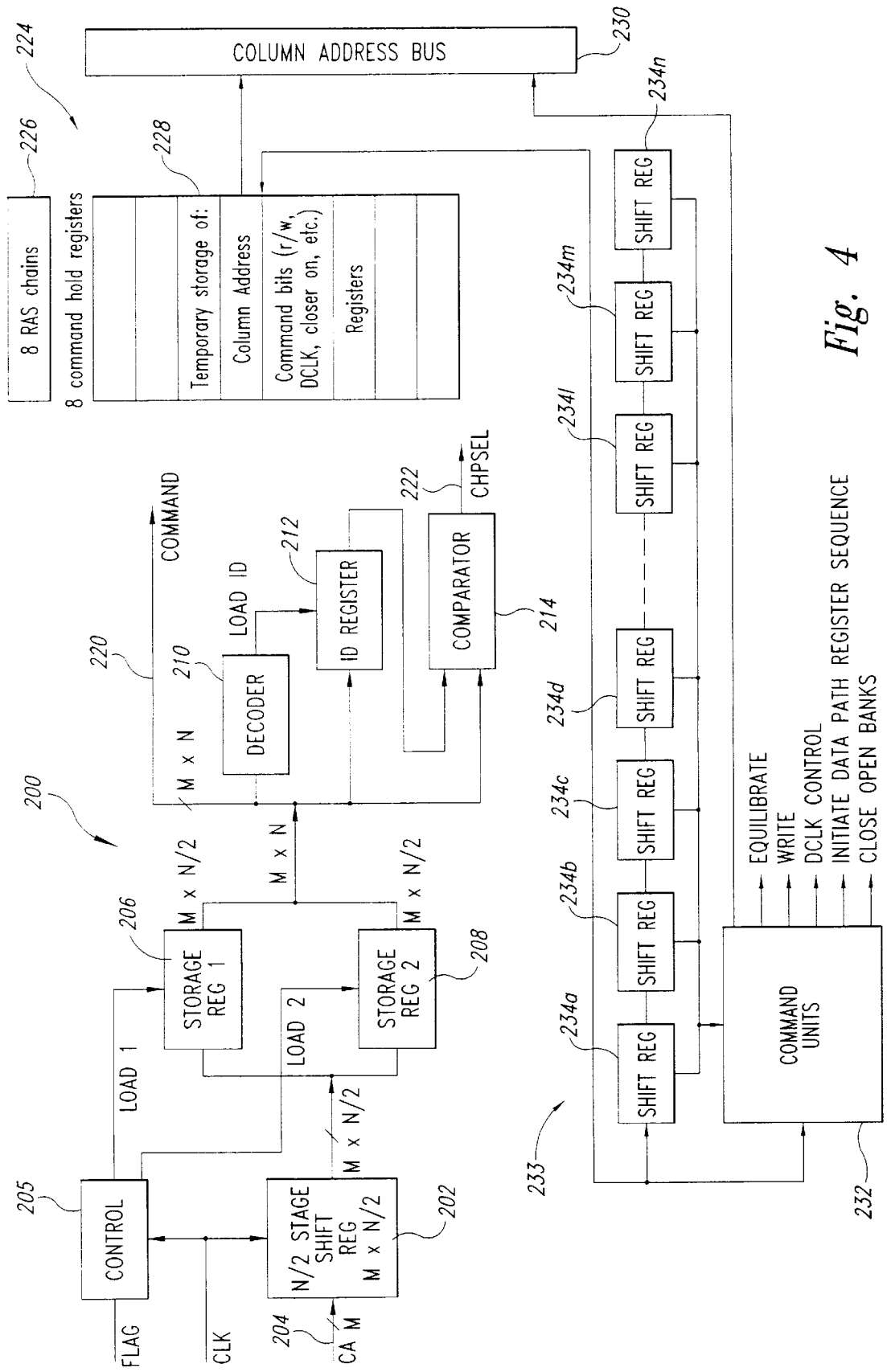
FIG. 4 is a block diagram of an embodiment of a command generator in accordance with the invention that is usable in the packetized DRAM of FIG. 3.

One embodiment of a command buffer 200 in accordance with the invention is illustrated in FIG. 4. The command buffer 200 can be used in place of the command buffer 46 in FIG. 3, and the resulting memory device may be used in the computer system shown in FIG. 1. With reference to FIG. 4, a command packet CA consisting of a plurality of packet words are applied to a shift register 202 via a command data bus 204. The width M of the bus 204 corresponds to the size of the shift register 202, and the number N of packet words in the command packet corresponds to an integer sub-multiple of the number of stages of the shift register 202. In the embodiment shown in FIG. 4, the shift register 202 has one-half the number of stages that are in the command packet, i.e., two shift stages since there are four packet words. Thus, the shift register 202 sequentially receives two groups of two 10-bit packet words responsive to a clock signal CLK. Coincident with the start of a four word command packet, a FLAG signal is applied to a control circuit 205 that is clocked by the CLK signal along with the shift register 202.

After two packet words have been shifted into the shift register 202, the control circuit 205 generates a LOAD1 signal that is applied to a first storage register 206. The first storage register 206 then loads the first two packet words from the shift register 202. After two more packet words have been shifted into the shift register 202, the control circuit 205 generates a LOAD2 signal that is applied to a second storage register 208. The second storage register 208 then loads the remaining two packet words from the shift register 202. The first and second storage registers 206, 208 then collectively output a 40-bit command word COMMAND on a command bus 220.

The command buffer 200 also includes a comparator 214 that selectively generates a CHPSEL signal on line 222. As explained below, the CHPSEL signal, when active high, causes the memory device containing the command buffer 200 to perform one of several functions corresponding to one or more of the COMMAND signals on the command bus 220.

In the embodiment shown in FIG. 4 in which two sets of two 10-bit command words are shifted into the shift register 202, the first and second storage registers 206, 208 receive and store 40 bits of command words. However, in the more general case, the shift register 202 has N/Y stages, each of which has a width of M bits, and Y storage registers 206, 208 each load N/Y M-bit command words. In an example where M is 8, and Y and N are both 4, the shift register 202 has a single stage having a width of 8 bits, and 4 storage registers each load 1 8-bit command word. Also, in the embodiment shown in FIG. 4, each of the command words is shifted through two stages of the shift register 202 each CLK cycle.

After the first storage register 206 has been loaded, it continuously outputs the first two packet words to an initialization decoder 210, an ID register 212, and a comparator 214. The function of the decoder 210, ID register 212, and comparator 214 is to examine the ID portion of the first packet word and determine whether the command packet is intended for the memory device containing the command buffer 200. More specifically, the command buffer 200 is programmed with a unique identifying code included in an initialization packet during an initialization routine. A portion of an initialization packet output from the storage register 206 is applied to the decoder 210, and another portion is applied to the ID register 212. The portion of the initialization packet is recognized by the decoder 210, which then generates a latch signal that causes the ID register 212 to store the other portion of the initialization packet. The portion of the initialization packet stored in the ID register 212 then uniquely identifies the memory device containing the command buffer 200. Thus, the portion of the initialization packet decoded by the decoder 210 is the same for all memory devices, while the portion of the initialization packet applied to the ID register 212 is different for each memory device. (During the initialization, means are provided to prevent all of the memory devices from simultaneously responding to the initialization packet, as explained below.) After initialization, the ID register 212 contains identifying data that is unique to the memory device that contains the command buffer 200.

After the identifying data have been stored in the ID register 212 during initialization, the memory device containing the command buffer 200 receives command packets to transfer data into and out of the memory device. An ID portion of the packet word applied to the memory device and stored in the storage register 206 is applied to the comparator 214. The comparator 214 then compares the ID portion of the packet word to the identifying data stored in the ID register 212. In the event of a match, the comparator 214 generates an active CHPSEL signal that causes the memory device to carry out the operation corresponding to the COMMAND on the command bus 220. Significantly, the comparator 214 is able to compare the ID portion of the command packet to the identifying data stored in the ID register 212 after only two of the packet words have been shifted into the shift register 202 since the ID portion is in the first packet word of the command packet, as shown in FIG. 2. Furthermore, the command buffer 200 is able to start decoding the first three command bits after the first two packet words have been shifted into the shift register 202. By processing a portion of the command packet before the entire command packet has been received by the command buffer 200, the command buffer is able to more rapidly complete processing of the command packet.

The COMMAND on the command bus 220 is also applied to a command unit 224 including a row command unit ("RCU") 226 and a column command unit ("CCU") 228. The RCU 226 is responsible for handling row addresses and row commands while the CCU 228 is responsible for handling column and bank addresses as well as commands relating to the columns of the memory arrays 80 (FIG. 3).

The CCU 228 outputs column and bank addresses to a column address bus 230, high level commands to a command execution unit 232, and timing signals to a sequencer 233 formed by a series of shift registers 234a–n. The shift registers 234 control the timing of column commands, such as EQUILIBRATE, WRITE, DCLK (data clock) CONTROL, etc., issued by the command execution unit 232 responsive to command signals from the CCU 228.

The RCU 226 may be of a somewhat conventional design, and will not be described in detail since it is somewhat peripheral to the claimed invention. The CCU 228, command execution unit 232, and sequencer 233 will be described in detail with reference to FIGS. 6–8.

Figure 5:
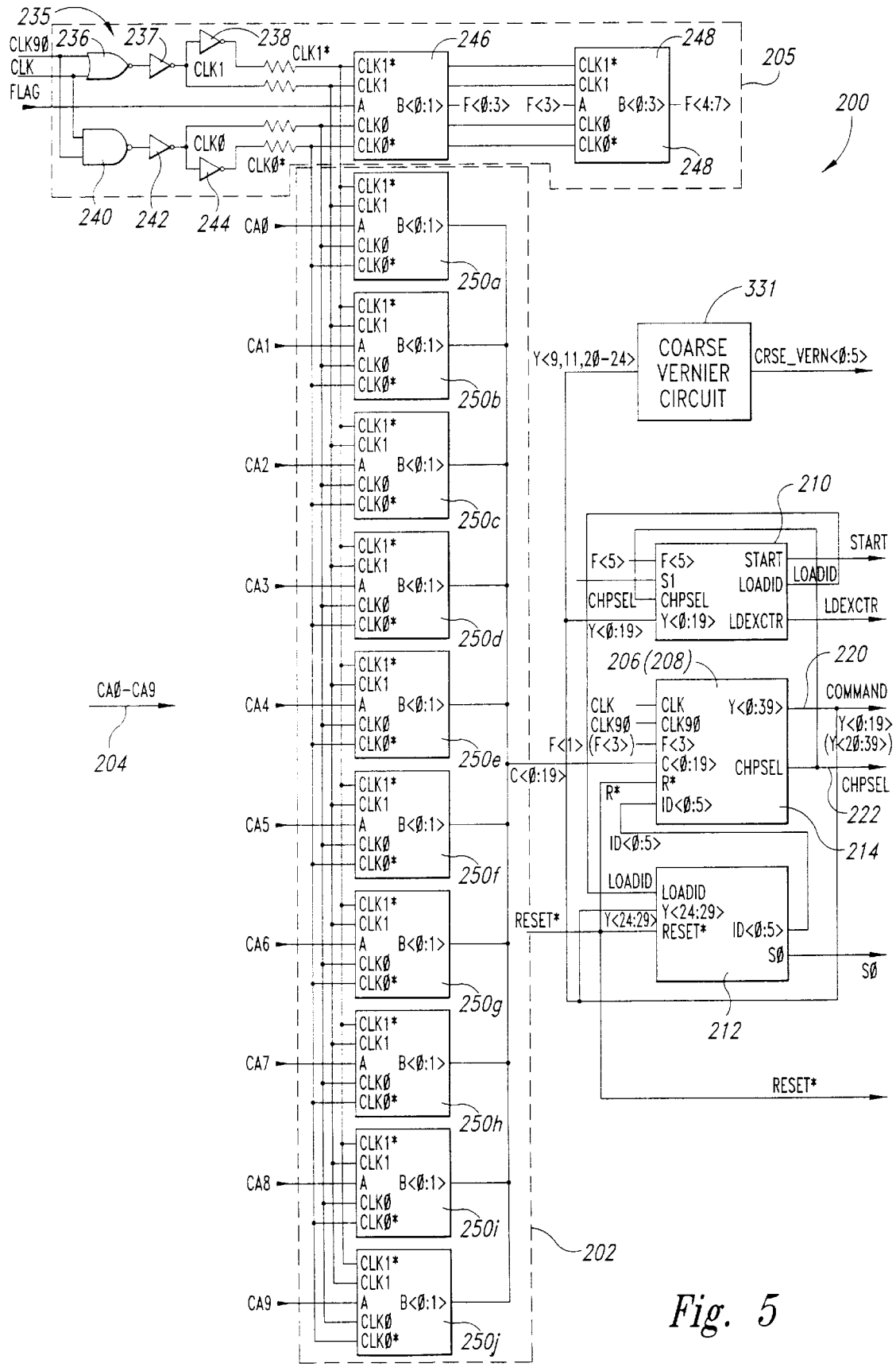
FIG. 5 is a more detailed block diagram of a command generator in accordance with the invention that is usable in the packetized DRAM of FIG. 3.

The shift register 202, control circuit 205, storage register 206, 208, initialization decoder 210, ID register 212 and comparator 214 are shown in greater detail in FIG. 5. With reference to FIG. 5, the control circuit 205 includes a clock circuit 235 that receives the clock signal CLK and its quadrature CLK90 from elsewhere in the memory device that contains the command buffer 200. The CLK and CLK90 signals are applied to a NOR gate 236 which outputs a high whenever CLK and CLK90 are both low. The output of the NOR gate 236 is applied through a first inverter 237 to generate a CLK1 signal and then through a second inverter 238 to generate a CLK1* signal (the "*" symbol after a signal name is used throughout to designate the compliment of the signal).

The CLK90 and CLK signals are also applied to a NAND gate 240 that outputs a low whenever both CLK and CLK90 are high. The output of the NAND gate 240 is coupled through an inverter 242 to generate a CLK0 signal and then through a second inverter 244 to generate a CLK0* signal. These signals are used throughout the command buffer 200.

The control circuit 205 also includes a pair of shift registers 246, 248 that are connected in series with each other to form an 8-stage shift register. The shift register 246 receives the FLAG signal and sequentially shifts it through the four stages of the shift register circuit 246 and then through the four stages of the shift register circuit 248 responsive to the CLK0, CLK0*, CLK1, and CLK1* signals. The FLAG signal is shifted through two stages of the shift register circuits 246, 248 each cycle of the CLK signals. Thus, when FLAG goes high, two successive F<7:0> outputs of the shift register circuits 246, 248 sequentially go high each clock cycle.

The shift register 202 shown in FIG. 4 includes ten separate shift register circuits 250*a–j*, each of which receive a respective bit CA0–CA9 of the incoming 10-bit packet word. Each of the shift register circuits 250*a–j* includes two shift register stages. Thus, after each clock cycle, two command bits CA have been shifted into each shift register circuit 250, and these bits are available as a 2-bit word B<1:0>. Thus, the ten shift register circuits 250*a–j* collectively output 20 bits of the command packet.

The remaining components of the command buffer 200 are the decoder 210, the ID Register 212, and the storage registers 206, 208 and comparator 214, which are shown as one block in FIG. 5. These components operate as explained above with reference to FIG. 4. However, the block diagram of FIG. 5 shows some additional signal inputs and outputs, namely, the S1 and RESET* inputs and the S0 output. All of these signal inputs and outputs are used during the initialization sequence. Specifically, at initialization, the RESET* is driven active low by conventional circuitry elsewhere in the memory device (not shown) to load predetermined identification data, i.e., the number "63," into the ID register 212. The RESET* signal also clears all 20 bits of each storage register 206, 208 so that a spurious COMMAND signal does not appear on the command bus 220. By setting the identification data in the ID register 212 to a known value, i.e., 63, the processor is able to subsequently load the ID register 212 with identifying data that is unique to the memory device containing the command buffer 200. As mentioned above, the comparator 214 must generate a CHPSEL signal to allow the memory device to perform various functions. Included in these various functions is decoding the portion of the command word that allows the decoder 210 to generate the LOADID signal. Thus, if the processor was not able to apply to the command buffer 200 a command packet containing the identifying data in the ID register 212, the comparator 214 would not generate the CHPSEL output. Without the CHPSEL output, the decoder 210 would not generate the LOADID output to load the identifying data into the ID register 212. However, the command packet initially contains the binary equivalent of 63 which is favorably compared by the comparator 214 to the "63" initial identifying data in the ID register 212. Thus, on this initialization command, the comparator 214 generates the CHPSEL signal which allows the decoder 210 to generate a LOADID signal that latches other portions of the command words into the ID register 212 as the unique identifying data for the memory circuit containing the command buffer 200.

The decoder 210 also generates a START pulse and a LDEXCTR pulse responsive to respective predetermined combinations of the command word bits Y<19:5> and the F<5> signal. As explained below, the START pulse is used to initiate the execution of a command in a command packet, and the LDEXCTR pulse is used to load a counter that is used in generating various command signals from the command.

During the initialization routine, all of the memory devices in the computer system 10 (FIG. 1) receive the same command packet and thus would latch the same identifying data into their respective ID registers 212 if there were not some means to prevent all of the memory devices from simultaneously responding to the initialization command packet. The S1 input and the S0 output are provided for this purpose. Assuming that the computer system 10 contains three memory devices 16 containing the command buffer 200, the S1 input of the first memory device is permanently held high through a jumper or similar means (not shown). A high S1 input allows the command decoder 210 to generate a LOADID output to load a portion of the command packet into the ID register 212 as the unique identifying data. The S0 output of the first memory device is coupled to the S1 input of the second memory device, and the S0 output of the second memory device is coupled to the S1 input of the third memory device. The S0 output of each of the memory devices is initially low. However, when unique identifying data is loaded into the ID register 212, the ID register 212 generates a high S0 output. The high S0 output coupled to the S1 input of the subsequent memory device allows the subsequent memory device to be programmed with the identifying data. Thus, after the identifying data has been loaded into the ID register 212 for the first memory device, its S0 output goes high thereby driving the S1 input of the second memory device high. As a result, the identifying data in the initialization command packet is loaded into the ID register 212 of the second memory device which then generates a high S0 output. The high S0 output drives the S1 input of the third memory device high which allows the ID register 212 of the third memory device to receive and store identifying data in the third initialization command packet. Once the unique identifying data has been stored in the ID register 212, the memory device no longer responds to the initialization command packet because the identifying data is no longer "63," which is the identifying data in the initialization command packet.

The command buffer 200 also includes a coarse vernier circuit 331. The coarse vernier circuit 331 generates a 6-bit coarse vernier word CRSE_VERN<5:0> from a portion of the command word Y<20:24, 11, 9>. As explained in U.S.

patent application Ser. No. 08/994,461, "Method and System for Processing Pipeline Memory Commands," The coarse vernier word CRSE_VERN<5:0> is used to preload counters (not shown in FIG. 5) in the column command unit 228 to select the latency of memory transfer operations.

Figure 6:
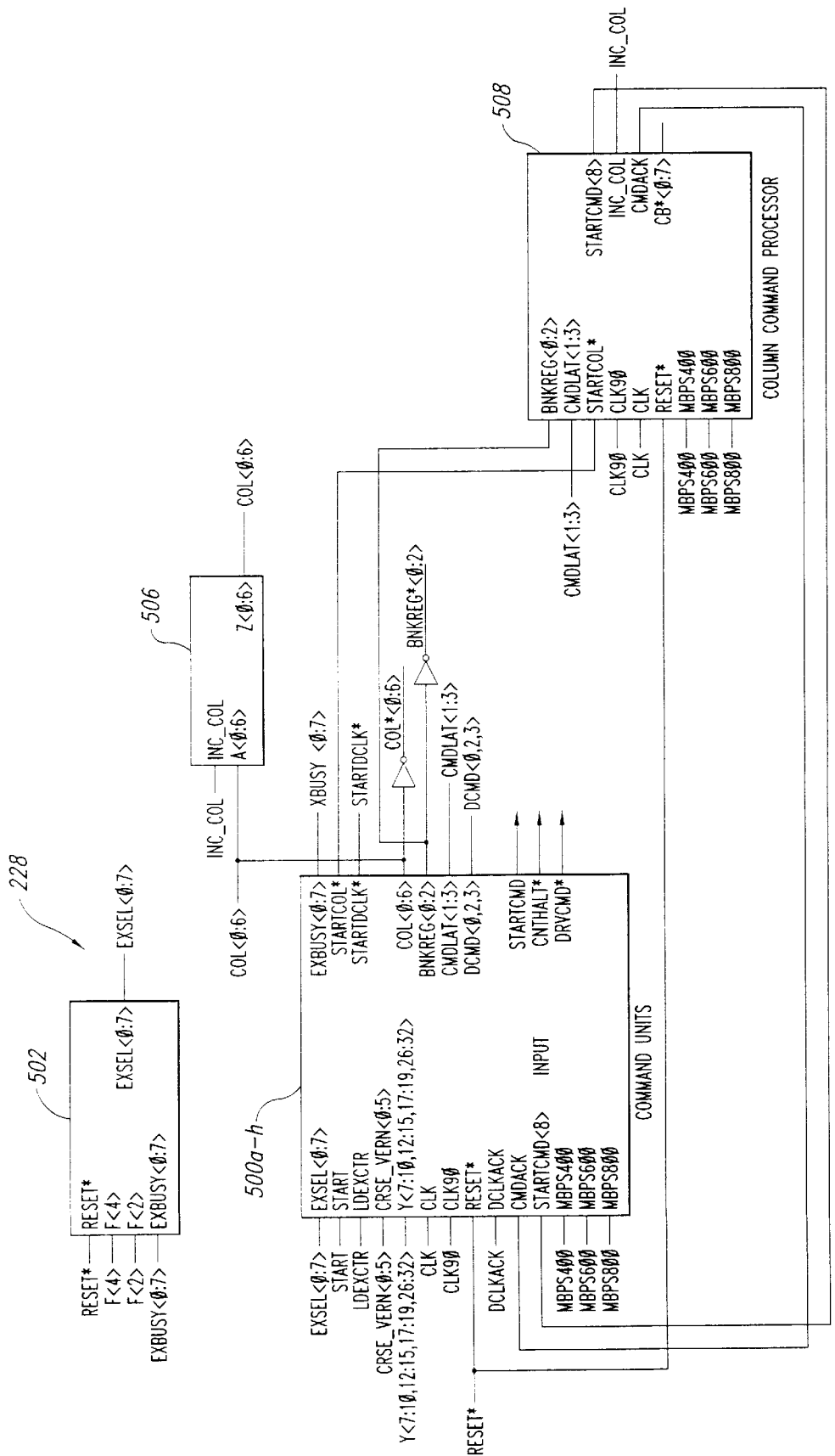
FIG. 6 is a block diagram of an embodiment of a command execution system that may be used in the command generator of FIG. 4.

As explained above with reference to FIG. 4, the command buffer 200 also includes a column command unit 228, a command execution unit 232 and a sequencer 233. These components are illustrated in greater detail in FIGS. 6–8. With reference to FIG. 6, the column command unit 228 includes eight command units 500 (shown as a single block in FIG. 6), and a single corresponding command unit selector 502.) The command units 500 receive bits Y<32:26, 19:17, 15:12, 10:7> of the command word stored in the storage registers 206, 208 (FIG. 4). Each of the command units also receive the coarse vernier signals CRSE_VERN<5:0> from the coarse vernier circuit 331 (FIG. 5), MBPS400–800 signals indicative of the clock speed from elsewhere in the command decoder 200, the clock signals CLK and CLK90, a data clock acknowledge signal DCLKACK, and one of eight select signals EXSEL<7:0>. As explained below, the EXSEL<7:0> signals enable respective ones of the eight command units 500. The command units 500 generate a seven bit column address COL<6:0> that is applied to a column address processing unit 506. The column address processing unit 506 outputs a column address COL<6:0> that corresponds to an initial column address which may be incremented responsive to an INC_COL signal. Finally, each of the command units 500 output busy signals EXBUSY<7:0> indicating that a respective one of the command units 500 is busy, and various control signals STARTCOL*, STARTDCLK*, BNKREG<2:0>, CMDLAT<3:1>, DCMD<3,2,0>, STARTCMD<7:0>, CNTHALT*, and DRVCMD* which are used in a manner described below and in U.S. patent application Ser. No. 08/994,461, "Method and System for Processing Pipeline Memory Commands."

The command unit selector 502 controls the storing of command words in each of the command units 500a–h in a manner that prevents a single command word from being stored in more than one command unit 500. As described in U.S. patent application Ser. No. 08/994,461, "Method and System for Processing Pipeline Memory Commands," the command unit selector 502 also prevents a command word from overwriting a command word previously stored in a command unit 500 before the command unit has generated corresponding command signals from the stored command word. Basically, each command unit 500 generates a respective active high EXBUSY<7:0> signal when a command word has been stored in the command unit 500a–h. After command signals have been generated from the stored command word, the EXBUSY<7:0> signals transitions inactive low so that command words may once again be stored in the command unit 500a–h.

The command unit selector 502 controls which of the command units 500a–h store a command word output from the storage registers 206, 208 by issuing an active high EXSEL<7:0> signal to one and only one of the command units 500a–h at a time. The command unit 500a–h receiving the EXSEL<7:0> signal then stores the command word. The command unit selector 502 determines which command unit 500a–h should receive the EXSEL<7:0> signal by examining respective EXBUSY<7:0> signals from all of the command units 500a–h. The command unit selector 502 arranges the command units 500a–h in a hierarchy from the first command unit 500a to store a command word (i.e., none of the command units have yet stored a command word) to the last command unit 500h to store a command word (i.e., all of the other command units 500a–g have already stored a command word). The command unit selector 502 issues an active high EXSEL<7:0> signal to a command unit only if its EXBUSY<7:0> signal is inactive low and the respective EXBUSY<7:0> signals for all command units 500 higher in the hierarchy are active high. The selected command unit 500 then receives and processes the command word COMMAND from the storage units 206, 208 as explained in greater detail below.

Each of the column command units 228 also includes a column command processor 508 that includes the column execution unit 232 and the sequencer 233 of FIG. 4. The column command processor 508 receives the BNKGEG<2:0>, CMDLAT<3:1>, and STARTCOL* signals from the command units 500, as well as the clock signals CLK and CLK90, and clock speed signals MBPS400–800 that are also applied to the command units 500a–h. The column command processor 508 then outputs the INC_COL signal to the column address processing unit 506, and STARTCMD<8>, CMDACK and CB*<7:0> signals to the command units 500a–h. The operation of the command units 500, column address processing unit 506, and the column command processor 508, both individually and in connection with each other, is explained in detail below.

Figure 7:
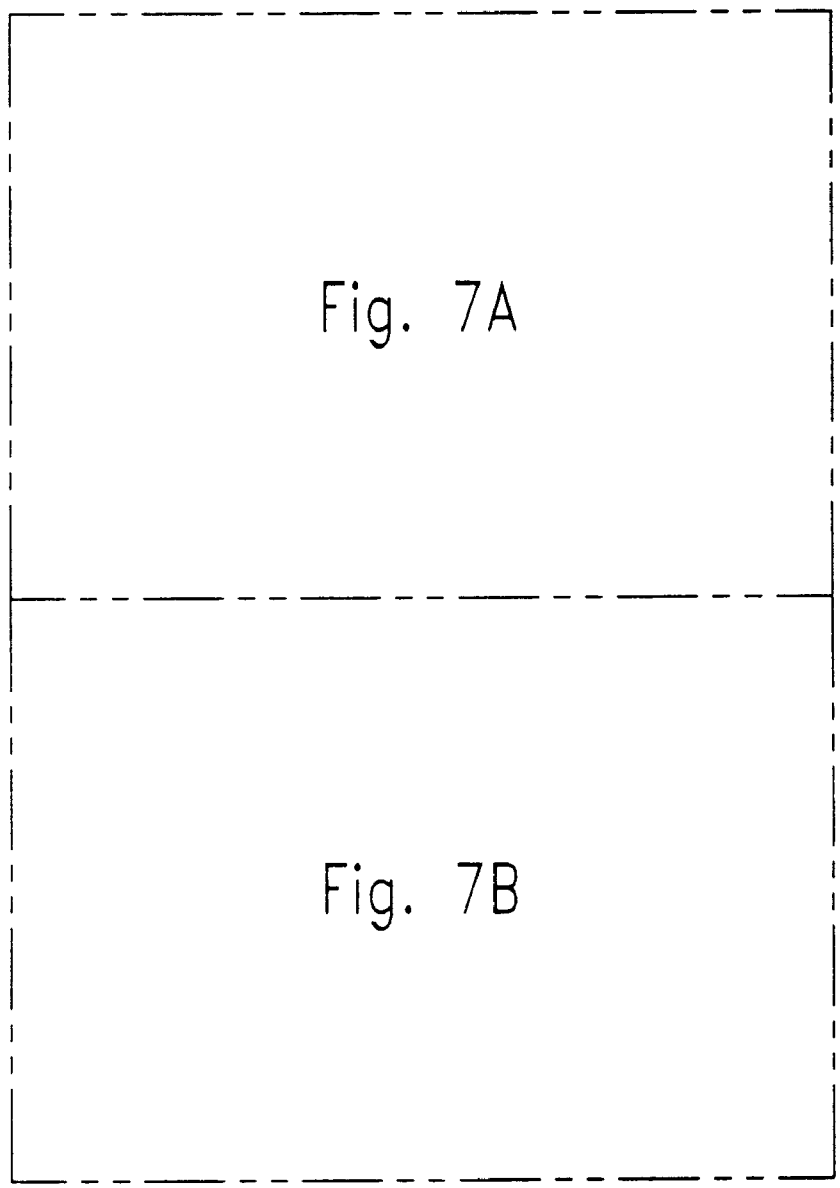
FIG. 7 is a block and logic diagram showing the command units of FIG. 6 in greater detail.

The command units 500a–h are illustrated in greater detail in FIG. 7. As mentioned above, each of the command units 500 includes a counter 550 that is preloaded with the CRSE_VERN<5:0> word responsive to the LDXCTR signal generated by the decoder 210 (FIG. 5). The counter 550 also receives a START signal which is also generated by the decoder 210. The START signal causes the counter 550 to begin decrementing. However, it will also be understood that the counter 550 alternatively can be an incrementing counter. The counter 550 is able to decrement responsive to the CLK and CLK90 signals only if its EXSEL input is high. Whenever the counter 550 starts decrementing, the counter 550 generates a short, active low START_EN* signal. The output of the counter is a 6-bit word CNT<5:0>. A start command generator 560 generates an active low CNTHALT* signal upon receipt of the CMDACK signal, as explained in greater detail below. The CNTHALT* signal causes the counter 550 to stop decrementing and performs other functions explained below.

The CNT<5:0> output of the counter 550 is decoded to generate various command signals by other portions of the memory device.

Figure 7A:
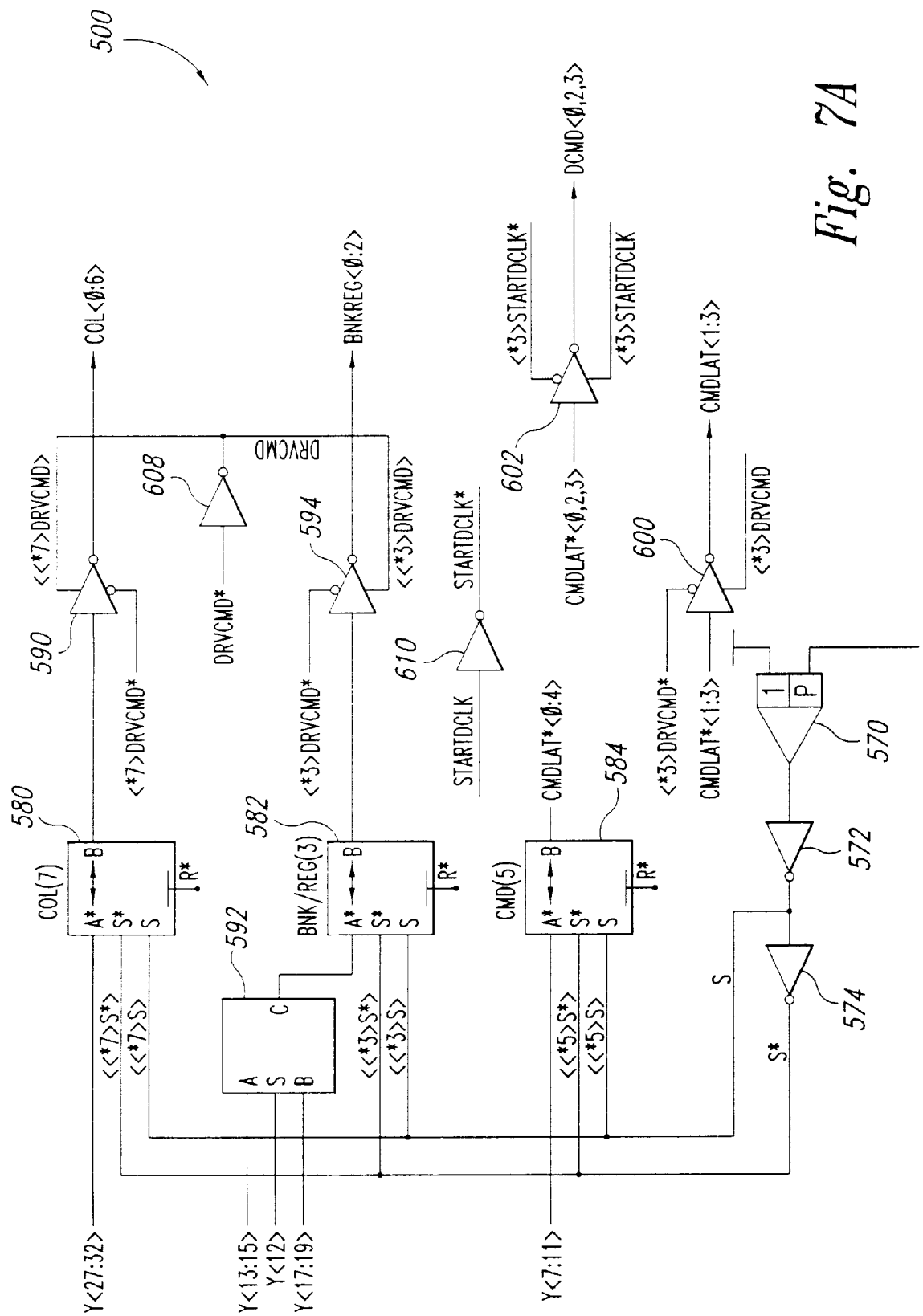
Figure 7B:
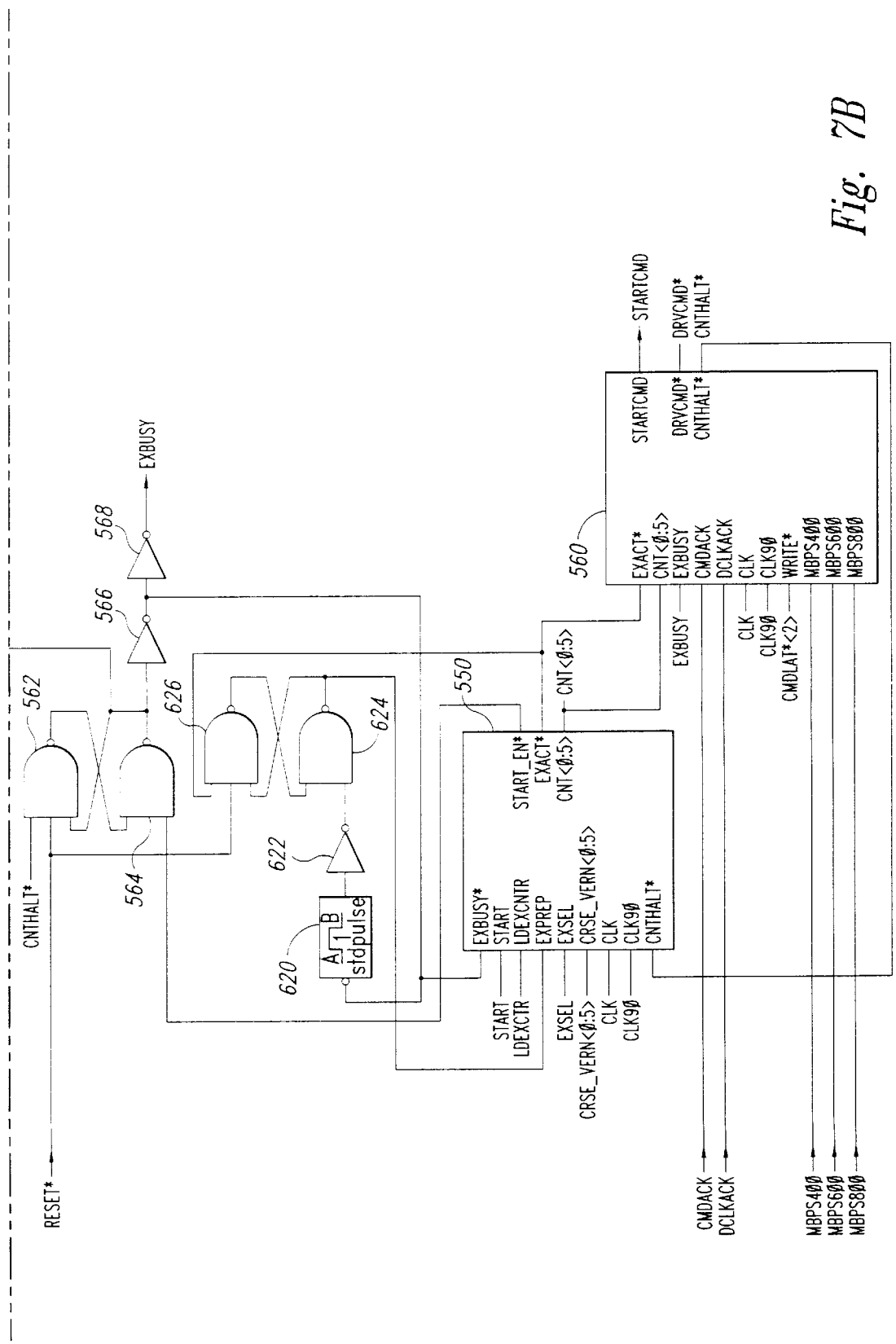

As explained above with reference to FIG. 6, each of the command units 500 also includes a respective command unit selector 502 that generates a respective EXSEL signal responsive to the EXBUSY signals from each of the command units 500. The EXBUSY signal is generated by a pair of NAND gates 562, 564 (FIG. 7B) connected to form a flip-flop. The output of the NAND gate 564 is coupled through two inverters 566, 568 to generate the EXBUSY signal at the output of the inverter 568. The flip-flop formed by the NAND gates 562, 564 is set to generate the active high EXBUSY signal by the START_EN* pulse when the counter 550 starts decrementing. Thus, when the counter 550 is decrementing, the active high EXBUSY signal indicates that the counter 550 is busy decrementing. The flip-flop fonned by the NAND gates 562, 564 is reset at power on by an active low RESET* signal. The flip-flop formed by the NAND gates 562, 564 is also reset by the active low CNTHALT* signal generated when the start command generator 560 receives the CMDACK signal. As mentioned above, the CNTHALT* signal prevents the counter 560 from decrementing further, and this CNTHALT* signal also terminates the EXBUSY signal to indicate that the counters 560 is no longer busy decrementing, freeing the command unit 500 to receive a new command word.

When the flip-flop formed by the NAND gates 562, 564 is set, the output of the NAND gate 564 triggers a delay circuit 570 (FIG. 7A), which is inverted by a pair of inverters 572, 574, to latch signals applied to various latches 580, 582, 584. The latch 580 stores command word bits Y<32:27> that, after being coupled through a tri-state inverter 590, comprises the column address COL<6:0>. Similarly, the latch 582 stores a bank or register address received from a multiplexer 592 that, after being inverted by a tri-state inverter 594, is output as a bank address BNKREG<2:0>. The bank address is Y<15:13>, and it is used to select one of the eight memory banks for a memory access. The multiplexer 592 selects either Y<15:13> or Y<19:17> as the bank address BNKREG<2:0> depending upon the state of the Y<12> command word bit. Finally, the command word bits Y<11:7> are stored in the latch 584 to generate a latched command word CMDLAT*<4:0>. Bits 1–3 of CMDLAT<4:0> are applied to a tri-state inverter 600 as CMDLAT*<3:1> to generate a CMDLAT<3:1> output. Similarly, CMDLAT* bits <3, 2, 0> are applied to a tristate inverter 602 to generate a DCMD<3, 2, 0> output. The tri-state buffers 590, 594, and 600 are switched between their active and high impedance states by the DRVCMD* signal and its compliment DRVCMD generated at the output of an inverter 608 to which a DRVCMD* signal is applied. The DRVCMD* signal is generated by the start command generator 560 as explained below. Similarly, the tri-state buffer 602 is switched between its active and high impedance states by the STARTDCLK signal and its compliment STARTDCLK*, which is generated at the output of an inverter 610 to which the STARTDCLK signal is applied.

When the EXBUSY signal transitions inactive low, the low-to-high transition at the output of the inverter 566 triggers a pulse generator 620 that causes a pulse to be generated at the output of an inverter 622. The pulse at the output of the inverter 622 sets a flip-flop formed by a pair of NAND gates 624, 626. As a result, an active high EXPREP signal is generated at the output of the NAND gate 624 which is used in a manner explained below. The flip-flop formed by the NAND gates 624, 626 is reset by either the active low RESET* signal or an active low EXACT* signal generated by the counter 550.

Figure 8:
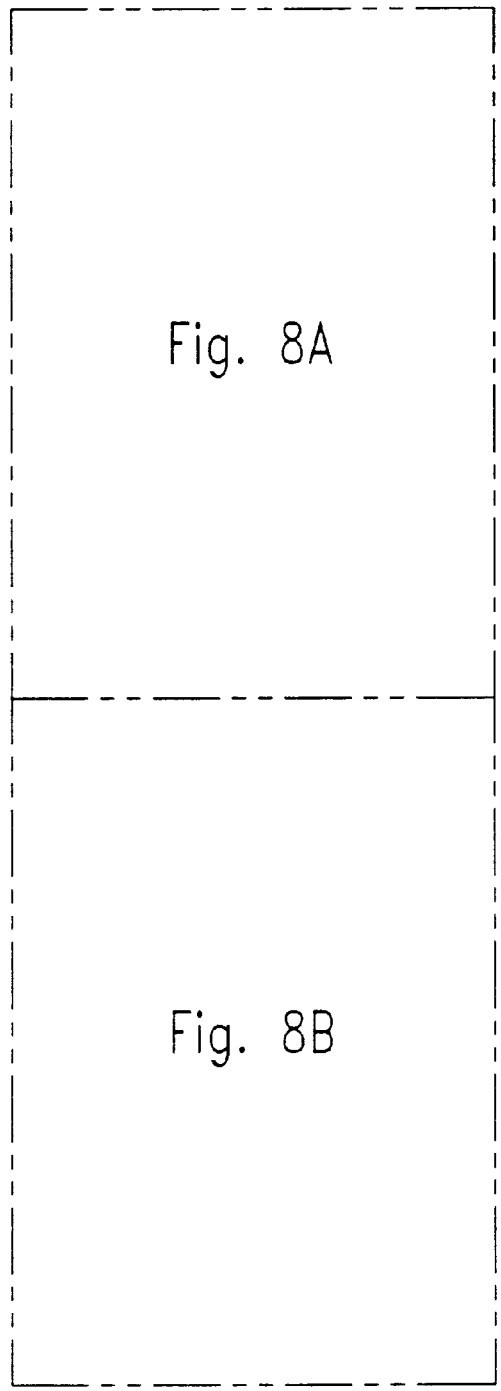
FIG. 8 is a logic diagram of the start command generator used in the command unit of FIG. 7.
Figure 8A:
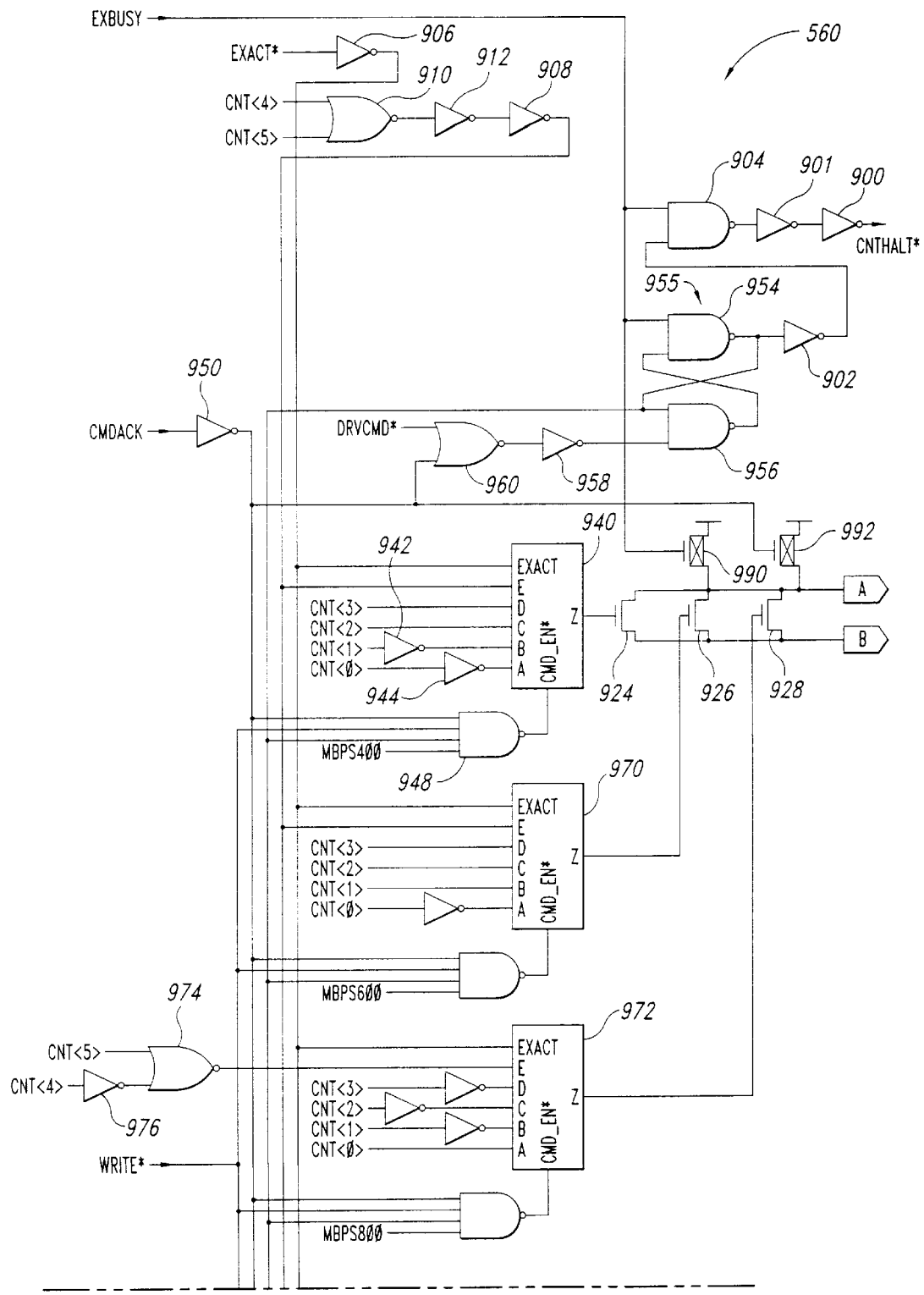

The start command generator 560 (FIG. 7) is illustrated in greater detail in FIG. 8. The basic function of the start command generator 560 is to generate various commands, namely CNTHALT*, DRVCMD*, and STARTCMD, at the proper time depending upon the frequency of the clock signals CLK and CLK90. The timing of these commands is a function of clock speed. For example, the commands are generated earlier at higher clock speeds to allow the memory device containing the command buffer more clock cycles to complete the various operations corresponding to the commands. The DRVCMD* signal is used to generate a command in the command unit 500 (FIG. 7) containing the start command generator 560, and the STARTCMD signal is used to start a column command as explained below.

An active low CNTHALT* signal is used, as described above, to indicate to the command unit 500 that the command processor 508 has received a command signal from the command unit 500, and to allow the command unit 500 to receive and begin processing a new command word. The active low CNTHALT* signal is generated at the output of an inverter 900, which is driven by a NAND gate 904 through an inverter 901. The CNTHALT* signal is generated whenever the output of the NAND gate 904 is low, which occurs whenever the NAND gate 904 is enabled by an active high EXBUSY signal and the output of an inverter 902 is high. The input of the inverter 902 is coupled to a flip-flop 955 formed by a pair of NAND gates 954, 956. The CNTHALT* signal is generated when the flip-flop 955 is set responsive to an inverter 958 applying a low to the NAND gate 956. However, the flip-flop 955 can be set only if the NAND gate 954 is enabled by the high EXBUSY signal, which occurs whenever the command unit 500 containing the start command generator 560 is active. The inverter 958 applies a low to the NAND gate 956 whenever a NOR gate 960 driving the inverter 958 is enabled by an active low DRVCMD* signal and the output of an inverter 950 is low, which occurs when a command acknowledgment signal CMDACK is active high.

As explained in U.S. patent application Ser. No. 08/994, 461, "Method and System for Processing Pipeline Memory Commands," the NOR gate 960 will be enabled by a low DRVCMD* signal at a first input whenever the STARTCMD is high. The STARTCMD will be high after the start command generator 560 FIG. 7) transmits the command signal to the command processor 508 and remains high until the command unit 500 receives the CMDACK signal. Thus, the DRVCMD* signal will be low prior to the enabled command unit 500 receiving the CMDACK signal.

In operation, the command unit selector 502 (FIG. 6) outputs a high EXSEL signal to select the command unit 500 containing the start command generator 560. The selected command unit 500 then generates a high EXBUSY signal, which enables the NAND gate 904 to allow the CNTHALT* signal to be generated, and it also enables the NAND gate 954 to allow the flip-flop 955 to be set. The NOR gate 960 will be enabled by a low DRVCMD* signal, as explained above, so that the flip-flop 955 will be set when the CMDACK signal transitions high, thereby generating the CNTHALT* signal. As explained above with reference to FIG. 6, the CMDACK signal is driven high by the column command processor 508 whenever the control signals issued by the command unit 500 have been received by the column command processor 508. As further explained above with reference to FIGS. 6 and 7, the control signals are issued by the command unit 500 when the appropriate count of the counter 550 (FIG. 7B) is reached. Thus, as soon as the command unit 500 has performed its function of issuing a control signal to the column command processor 508, and the column command processor 508 has received this control signal, the CNTHALT* signal is generated to free the command unit 500 to receive a new packet word.

As explained above with reference to FIG. 7B, the CNTHALT* signal is applied to the NAND gate 562 (FIG. 7B) to drive the EXBUSY signal for the command unit 500 low, thereby indicating to the command unit selector 502 (FIG. 6) that the command unit 500 is free to process a new packet word. The low EXBUSY signal is applied to the NAND gate 904 to terminate the active low CNTHALT* signal, and it is applied to the NAND gate 954 to reset the flip-flop 955 and maintain the CNTHALT* signal high.

In the past, the CNTHALT* was not generated until the counter 550 had decremented to the zero terminal account. The command unit 500 was therefore not free to process a new packet word until the zero count of the counter 550 was reached, even though the command unit 500 had completed its control signal issuing task when an earlier count had been reached. Thus, the command unit 500 was needlessly idle during the period that the counter 550 decremented to zero from the count that issued the control signal.

Figure 8B:
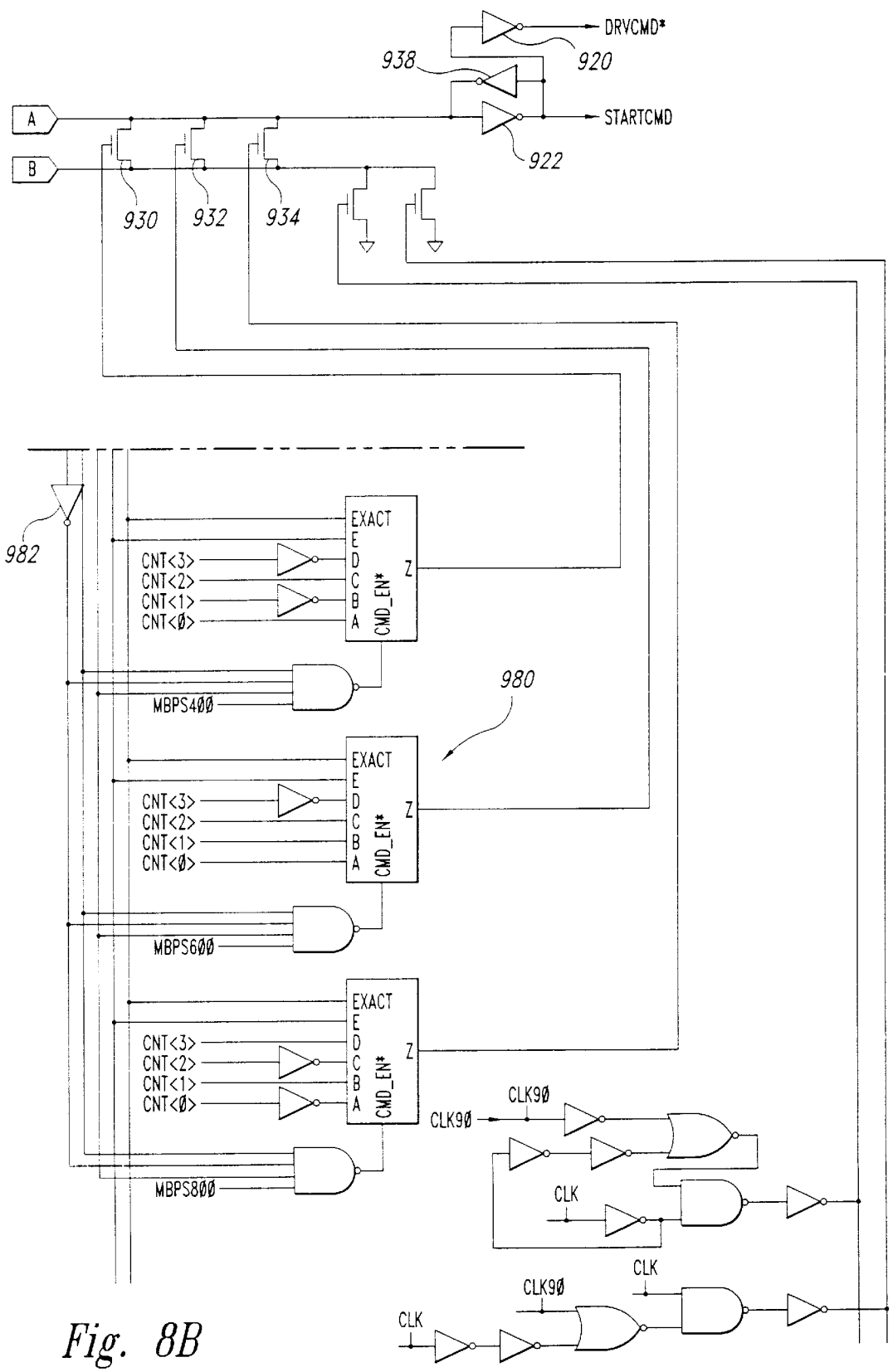

The remainder of the start command generator 560 shown in FIG. 8 generates the DRVCMD* and STARTCMD signals at the proper time depending upon the clock frequency. The DRVCMD* signal at the output of an inverter 920 (FIG. 8B) will go low whenever the STARTCMD signal goes high. The STARTCMD signal at the output of an inverter 922 goes high whenever its input is pulled low by any one of six NMOS transistors 924–934 turning ON. The high at the output of the inverter 922 is then latched by an inverter 938. Thus, the DRVCMD* and STARTCMD signals are generated responsive to any one of the transistors 924–934 turning ON.

The NMOS transistor 924 will turn ON responsive to the output of an AND gate 940 going high. The AND gate 940 receives the four least significant bits CNT<3:0> of the counter 550, two of which CNT<1:0> are inverted by inverters 942, 944. The AND gate 940 also receives the output of the inverter 908 which, as explained below, is high whenever CNT<5:4> are both high. Thus, the AND gate 940 decodes a "001100" count of the counter 550, i.e., count 12. The AND gate 940 is enabled by a low at the output of a NAND gate 948 which occurs whenever all of the inputs to the NAND gate 948 are high. The NAND gate 948 normally receives a high at the output of an inverter 950, since the CMDACK signal is normally low until a command initiated by the start command generator 560 is acknowledged by the column command processor 508 (FIG. 6), as explained above. The NAND gate 948 also receives the WRITE* signal, which is inactive high for read operations. The NAND gate 948 also receives the output of the flip-flop formed by a pair of NAND gates 954, 956. The flip-flop is initially set by EXBUSY being low prior to the time that the counter 550 begins decrementing. The flip-flop is reset responsive to a low at the output of the inverter 958, which occurs when a NOR gate 960 is enabled by a low DRVCMD* signal and CMDACK goes active high. Finally, the NAND gate 948 receives the MBPS400 signal indicative of a 400 MHz clock frequency. Thus, the transistor 924 turns ON at count 12 of the counter 550 during a read operation at a 400 MHz clock frequency.

Similarly, the transistor 926 will turn ON responsive to a high from an AND gate 970, which occurs when the NOR gate 970 decodes a count CNT<5:0> of "001110", i.e., count 14 of the counter 550, during a read operation at a clock frequency of 600 MHz. The transistor 928 will turn ON responsive to a high at the output of an AND gate 972. The AND gate 972 receives CNT<0>, the compliment of CNT<3:1>, and the output of a NOR gate 974. The NOR gate 974 receives CNT<5> and the compliment of CNT<4> through an inverter 976. The output of the NOR gate 974 thus goes high when CNT<5:4> are "01". Thus, the AND gate 972 decodes a count CNT<5:0> of "010001", i.e., count 17 of the counter 550, during a read operation at a clock frequency of 800 MHz. It can therefore been seen that STARTCMD will go high in a read operation at a time corresponding to the clock speed designated by the MBPS signals, with a higher clock speed causing the STARTCMD signal to be generated earlier in the count-down and a lower clock speed causing the STARTCMD signal to be generated later in the count-down. By generating the STARTCMD signal earlier at higher clock speeds, the memory device has more clock cycles to respond to commands so that the time allotted to process commands is relatively uniform regardless of the clock speed.

The start command generator 560 includes additional circuitry that is structurally and functionally identical to the above-described circuitry except that the AND gates in the circuitry 980 receive the compliment of WRITE* at the output of an inverter 982 rather than WRITE*, and they decode different counts of CNT<5:0>. Thus, in the interest of brevity, this additional circuitry will not be explained in detail. Since the AND gates are enabled by a high compliment of WRITE*, the AND gates in the circuitry 980 cause the STARTCMD signal to be generated at counts of the clock corresponding to respective clock speeds. Specifically, for write operations, the STARTCMD signals will be generated at count 5 of the counter 550 for a 400 MHz clock frequency, at count 7 of the counter 550 for a 600 MHz clock frequency, and at count 10 of the counter 550 for an 800 MHz clock frequency. These counts of 5, 7 and 10 for a write operation occur later than counts 12, 14 and 17 for a read operation since a read operation requires more time than a write operation, thereby requiring that the STARTCMD signal for a read operation be generated earlier, i.e., at a higher count.

The STARTCMD signal goes inactive low and the DRVCMD* signal goes inactive high responsive to either of two PMOS transistors 990, 992 being turned on. The PMOS transistor 990 is turned on by the EXBUSY signal going low responsive to the CNTHALT* signal, and the PMOS transistor 992 is turned on by an active low memory RESET* signal. Thus, in normal operation, the active STARTCMD and DRVCMD* signals terminate when the command unit 500 is released when the EXBUSY signal goes low responsive to the CNTHALT* signal.

The remainder of the circuitry in the memory device 16 (FIG. 3) fuictions as described in U.S. patent application Ser. No. 08/994,461, "Method and System for Processing Pipeline Memory Commands," and will not be described further in the interest of brevity.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory device command generator to receive command packets indicative of a memory command, a row address and a column address, the command generator comprising:

a plurality of command units, each of the command units being enabled upon receipt of an acknowledgment signal, each of the command units, when enabled, operable to store a plurality of command bits of a command packet received by the command units and to output at least one command signal corresponding to the command bits; and a command processor coupled to each of the command units, the command processor operable to receive at least one of the command signals output from an enabled command unit, to generate the acknowledgment signal in response to one of the command signals, and to process the command signals by generating at least one control signal responsive thereto.

2. The memory device command generator of claim 1, further comprising a command unit selector coupled to each of the command units, the command unit selector operable to determine which of the command units are available to store command bits, and to enable one of the available command units to store a plurality of command bits.

3. The command generator of claim 1 wherein each of the command units comprise:

a counter operable to count in one direction from a first count to a second count responsive to a clock signal, the counting being initiated responsive to a start signal derived from a timing signal associated with the command packet received by a command unit when the command unit is enabled; and a start command generator generating a start command signal at one of a plurality of respective counts of the counter that are a function of the nature of the command indicated by the stored command bits, the start command signal causing the command processor coupled to each of the command units to process the command bits to generate the control signal and the acknowledgment signal.

4. The command generator of claim 3 wherein the counts at which the start command generator generates the start command signal is further a function of a clock speed signal indicative of the frequency of the clock signal.

5. The command generator of claim 3 wherein the count at which the start command signal is generated is intermediate the first and second counts.

6. The command generator of claim 1 wherein each of the command units comprise:

a counter counting in one direction from an initial count to a terminal count responsive to a clock signal, the counting being initiated responsive to a start signal derived from a timing signal associated with the command packet received by a command unit when the command unit is enabled; and a start command generator generating a start command signal at one of a plurality of respective counts of the counter that are a function of a clock speed signal indicative of the frequency of the clock signal, the start command signal causing the command processor coupled to each of the command units to process the bits to generate the control signal and the acknowledgment signal.

7. The command generator of claim 6 wherein the counter tenninates counting responsive to a count halt signal.

8. The command generator of claim 6 wherein the count at which the start command signal is generated is intermediate the initial count and the terminal count.

9. The command generator of claim 1 wherein the plurality of command units are coupled to the command processor through a common bus shared by all of the command units.

10. The command generator of claim 1 wherein each of the command units is operable to generate a respective start command signal to cause the command processor to process the bits received from the command unit to generate the control signal, each of the command units operable to generate the start command signal until receipt of the acknowledgment signal, and wherein the command processor is operable to generate the acknowledgment signal responsive to receipt of the start command signal and to couple the acknowledgment signal to the command unit from which it received the start command signal.

11. The command generator of claim 1 wherein the command processor initiates processing of the command bits responsive to a start command signal, and wherein each of the command units comprise:

a counter operable to count in one direction from a first count to a second count responsive to a clock signal, the counting being initiated responsive to a start signal derived from a timing signal associated with the command packet received by a command unit when the command unit is enabled;

a counter preloader coupled to the counter and operable to load the counter with a value of the initial count that corresponds to the timing of the command packet as received at a predetermined location in the command generator;

a plurality of counter decoders coupled the counter to receive the count of the counter, the counter decoders each operable to generate the start command signal responsive to decoding respective values of the count, the value decoded by each decoder being a function of at least one of the clock speed and the nature of the command indicated by the command bits applied to the command unit; and a latch receiving the command bits applied to the command unit, the latch operable to store the command bits in the command unit responsive to the start command signal.

12. A memory device command generator receiving command packets indicative of a memory command, a row address and a command address, the command generator comprising:

a command buffer operable to receive and to store at least a portion of at least one packet word in each command packet, the command buffer operable to apply the stored portion of each command packet to a command bus;

a plurality of command units coupled to the command bus of the command buffer, each of the command units operable to be enabled upon receipt of an acknowledgment signal and, when enabled, operable to store a plurality of command bits of at least one packet word and to output the command bits stored in the command unit to an output bus, and operable to generate a respective busy signal indicating that the command unit is storing command bits and has not output the stored command bits to the output bus, each of the command units comprising;

a counter operable to count in one direction from a first count to a second count responsive to a clock signal, the counting being initiated responsive to a start signal derived from a timing signal associated with the command packet received by an enabled command unit; and a start command generator operable to generate a start command signal at one of a plurality of respective counts of the counter that are a function of a clock speed signal indicative of the frequency of the clock signal;

a control circuit operable to receive the busy signals from the respective command units to determine which of the command units are storing a portion of a packet word, the control circuit operable to apply a respective select signal to one of the command units from which a busy signal is not being received to cause the command unit receiving the select signal to store the portion of the packet word received from the command buffer; and a command processor coupled to the output bus of the command units to receive the command bits and coupled to the command units to receive the start command signals, the command processor operable to generate a command signal responsive to a clock signal, the clock speed signal, and the nature of the memory operation, and operable to generate the acknowledgment signal responsive to receiving one of the start command signals.

13. The command generator of claim 12 wherein the counter terminates counting responsive to a count halt signal, and wherein each of the command units is operable to generate the count halt signal in response to receiving the acknowledgment signal.

14. The command generator of claim 12 wherein the count at which the start command signal is generated is intermediate the first and second counts.

15. A packetized dynamic random access memory, comprising:
   a clock generator circuit operable to generate an internal clock signal having a phase relative to an external clock signal determined by a phase command signal;
   at least one array of memory cells operable to store data at a location determined by a row address and a column address;
   a row address circuit operable to receive and decode the row address, and to select a row of memory cells corresponding to the row address responsive to a first set of command signals;
   a column address circuit operable to receive or apply data to one of the memory cells in the selected row corresponding to the column address responsive to a second set of command signals;
   a data path circuit operable to couple data between an external terminal and the column address circuit responsive to a third set of command signals; and
   a command generator operable to receive command packets indicative of a command, a row address and a command address, the command generator comprising:
      a plurality of command units, each of the command units being enabled upon receipt of an acknowledgment signal, each of the command units, when enabled, operable to store a plurality of command bits of a command packet received by the command units and to output at least one command signal corresponding to the command bits; and
      a command processor coupled to each of the command units, the command processor operable to receive at least one of the command signals output from an enabled command unit, to generate the acknowledgment signal in response to one of the command signals, and to process the command signals by generating at least one control signal responsive thereto.

16. The packetized dynamic random access memory of claim 15, further comprising a command unit selector coupled to each of the command units, the command unit selector operable to determine which of the command units are available to store command bits, and to enable one of the available command units to store a plurality of command bits, the command unit selector further operable to activate one of the command units.

17. The packetized dynamic random access memory of claim 15 wherein each of the command units comprise:
   a counter operable to count in one direction from a first count to a second count responsive to a clock signal, the counting being initiated responsive to a start signal derived from a timing signal associated with the command packet received by a command unit when the command unit is enabled; and
   a start command generator oenerating a start command signal at one of a plurality of respective counts of the counter that are a function of the nature of the command indicated by the stored command bits, the start command signal causing the command processor coupled to each of the command units to process the command bits to generate the control signal and the acknowledgment signal.

18. The packetized dynamic random access memory of claim 17 wherein the counts at which the start command generator generates the start command signal is further a function of a clock speed signal indicative of the frequency of the clock signal.

19. The packetized dynamic random access memory of claim 17 wherein the count at which the start command signal is generated is intermediate the first and second counts.

20. The packetized dynamic random access memory of claim 15 wherein each of the command units comprise:
   a counter counting in one direction from an initial count to a terminal count responsive to a clock signal, the counting being initiated responsive to a start signal derived from a timing signal associated with the command packet received by a command unit when the command unit is enabled; and
   a start command generator generating a start command signal at one of a plurality of respective counts of the counter that are a function of a clock speed signal indicative of the frequency of the clock signal, the start command signal causing the command processor coupled to each of the command units to process the bits to generate the control signal and the acknowledgment signal.

21. The packetized dynamic random access memory of claim 20 wherein the counter terminates counting responsive to a count halt signal.

22. The packetized dynamic random access memory of claim 20 wherein the count at which the start command signal is generated is intermediate the initial count and the terminal count.

23. The packetized dynamic random access memory of claim 15 wherein the plurality of command units are coupled to the command processor through a common bus shared by all of the command units.

24. The packetized dynamic random access memory of claim 15 wherein each of the command units is operable to generate a respective start command signal to cause the command processor to process the bits received from the command unit to generate the control signal, each of the command units operable to generate the start command signal until receipt of the acknowledgment signal, and wherein the command processor is operable to generate the acknowledgment signal responsive to receipt of the start command signal and to couple the acknowledgment signal to the command unit from which it received the start command signal.

25. The packetized dynamic random access memory of claim 15 wherein the command processor initiates processing of the command bits responsive to a start command signal, and wherein each of the command units comprise:
   a counter operable to count in one direction from a first count to a second count responsive to a clock signal, the counting being initiated responsive to a start signal derived from a timing signal associated with the command packet received by a command unit when the command unit is enabled;
   a counter preloader coupled to the counter and operable to load the counter with a value of the initial count that corresponds to the timing of the command packet as received at a predetermined location in the command generator;
   a plurality of counter decoders coupled the counter to receive the count of the counter, the counter decoders each operable to generate the start command signal responsive to decoding respective values of the count, the value decoded by each decoder being a function of at least one of the clock speed and the nature of the command indicated by the command bits applied to the command unit; and a latch receiving the command bits applied to the command unit, the latch operable to store the command bits in the command unit responsive to the start command signal.

26. A computer system, comprising:

a processor having a processor bus;

an input device coupled to the processor through the processor bus to allow data to be entered into the computer system;

an output device coupled to the processor through the processor bus to allow data to be output from the computer system; and a packetized dynamic random access memory coupled to the processor bus to allow data to be stored, to receive a plurality of input signals and generate a plurality of output signals on respective, externally accessible terminals, the packetized dynamic random access memory comprising:

a clock generator circuit generating an internal clock signal having a phase relative to an external clock signal determined by a phase command signal;

at least one array of memory cells to store data at a location determined by a row address and a column address;

a row address circuit to receive and decode the row address, and select a row of memory cells corresponding to the row address responsive to a first set of command signals;

a column address circuit to receive or apply data to one of the memory cells in the selected row corresponding to the column address responsive to a second set of command signals;

a data path circuit to couple data between an external terminal and the column address circuit responsive to a third set of command signals; and a command generator receiving command packets indicative of a command, a row address and a command address, the command generator comprising:

a plurality of command units, each of the command units being enabled upon receipt of an acknowledgment signal, each of the command units, when enabled, operable to store a plurality of command bits of a command packet received by the command units and to output at least one command signal corresponding to the command bits; and a command processor coupled to each of the command units, the command processor operable to receive at least one of the command signals output from an enabled command unit, to generate the acknowledgment signal in response to one of the command signals, and to process the command signals by generating at least one control signal responsive thereto.

27. The computer system of claim 26, further comprising a command unit selector coupled to each of the command units, the command unit selector operable to determine which of the command units are available to store command bits, and to enable one of the available command units to store a plurality of command bits.

28. The computer system of claim 26 wherein each of the command units comprise:

a counter operable to count in one direction from a first count to a second count responsive to a clock signal, the counting being initiated responsive to a start signal derived from a timing signal associated with the command packet received by a command unit when the command unit is enabled; and a start command generator generating a start command signal at one of a plurality of respective counts of the counter that are a function of the nature of the command indicated by the stored command bits, the start command signal causing the command processor coupled to each of the command units to process the command bits to generate the control signal and the acknowledgment signal.

29. The computer system of claim 28 wherein the counts at which the start command generator generates the start command signal is further a function of a clock speed signal indicative of the frequency of the clock signal.

30. The computer system of claim 28 wherein the count at which the start command signal is generated is intermediate the first and second counts.

31. The computer system of claim 26 wherein each of the command units comprise:

a counter counting in one direction from an initial count to a terminal count responsive to a clock signal, the counting being initiated responsive to a start signal derived from a timing signal associated with the command packet received by a command unit when the command unit is enabled; and a start command generator generating a start command signal at one of a plurality of respective counts of the counter that are a function of a clock speed signal indicative of the frequency of the clock signal, the start command signal causing the command processor coupled to each of the command units to process the bits to generate the control signal and the acknowledgment signal.

32. The computer system of claim 31 wherein the counter terminates counting responsive to a count halt signal.

33. The computer system of claim 31 wherein the count at which the start command signal is generated is intermediate the initial count and the terminal count.

34. The computer system of claim 26 wherein the plurality of command units are coupled to the command processor through a common bus shared by all of the command units.

35. The computer system of claim 26 wherein each of the command units is operable to generate a respective start command signal to cause the command processor to process the bits received from the command unit to generate the control signal, each of the command units operable to generate the start command signal until receipt of the acknowledgment signal, and wherein the command processor is operable to generate the acknowledgment signal responsive to receipt of the start command signal and to couple the acknowledgment signal to the command unit from which it received the start command signal.

36. The computer system of claim 26 wherein the command processor initiates processing of the command bits responsive to a start command signal, and wherein each of the command units comprise:

a counter operable to count in one direction from a first count to a second count responsive to a clock signal, the counting being initiated responsive to a start signal derived from a timing signal associated with the command packet received by a command unit when the command unit is enabled;

a counter preloader coupled to the counter and operable to load the counter with a value of the initial count that corresponds to the timing of the command packet as received at a predetermined location in the command generator;

a plurality of counter decoders coupled the counter to receive the count of the counter, the counter decoders each operable to generate the start command signal responsive to decoding respective values of the count, the value decoded by each decoder being a function of at least one of the clock speed and the nature of the command indicated by the command bits applied to the command unit; and a latch receiving the command bits applied to the command unit, the latch operable to store the command bits in the command unit responsive to the start command signal.

37. A method of processing memory commands applied to a memory device, comprising:

enabling a command unit responsive to receiving an acknowledgment signal;

storing a plurality of command bits of the memory command by the enabled command unit;

processing the command bits stored in the enabled command unit to generate at least one command signal;

applying at least one command signal to a command processor;

processing at least one command signal applied to the command processor to generate a control signal responsive to one of the command signals and to generate the acknowledgment signal responsive to one of the command signals; and applying the acknowledgment signal to the command unit.

* * * * *

UNITED STATES PATENT AND TRADEMARK OFFICE
CERTIFICATE OF CORRECTION

PATENT NO. : 6,178,488 B1
DATED : January 23, 2001
INVENTOR(S) : Troy A. Manning It is certified that error appears in the above-identified patent and that said Letters Patent is hereby corrected as shown below:

<u>Title page, Item [54] and Column 1, line 1,</u>
"METHOD AND APPARATUS" should read -- METHOD AND SYSTEM --

<u>Title page,</u>
Item [57], ABSTRACT,
Line 2, "in a packefized memory" should read -- in a packetized memory --

<u>Column 17,</u>
Line 38, "tenninate counting" should read -- terminates counting --

<u>Column 18,</u>
Line 6, "coupled the counter" should read -- coupled to the counter --

<u>Column 19,</u>
Line 63, "generator oenerating a" should read -- generator generating a --

<u>Column 20,</u>
Line 66, "coupled the counter" should read -- coupled to the counter --

<u>Column 23,</u>
Line 6, "operable to gencrate the" should read -- operable to generate the --

Signed and Sealed this

Sixth Day of May, 2003

JAMES E. ROGAN
*Director of the United States Patent and Trademark Office*